United States Patent
Lim et al.

(10) Patent No.: US 8,064,024 B2
(45) Date of Patent: Nov. 22, 2011

(54) TRANSFLECTIVE THIN FILM TRANSISTOR SUBSTRATE OF LIQUID CRYSTAL DISPLAY DEVICE HAVING A CONTACT ELECTRODE CONNECTING A DATA LINK TO A DATA LINE

(75) Inventors: Joo Soo Lim, Gumi-si (KR); Woong Sik Kim, Seongnam-si (KR)

(73) Assignee: LG Display Co., Ltd., Seoul (KR)

( * ) Notice: Subject to any disclaimer, the term of this patent is extended or adjusted under 35 U.S.C. 154(b) by 358 days.

(21) Appl. No.: 11/169,720

(22) Filed: Jun. 30, 2005

(65) Prior Publication Data

US 2006/0119772 A1 Jun. 8, 2006

(30) Foreign Application Priority Data

Dec. 4, 2004 (KR) .................. 10-2004-0101553

(51) Int. Cl.
*G02F 1/1343* (2006.01)
*G02F 1/1345* (2006.01)
(52) U.S. Cl. .................. 349/141; 349/150; 349/152
(58) Field of Classification Search .................. 349/113, 349/149–152, 141
See application file for complete search history.

(56) References Cited

U.S. PATENT DOCUMENTS

| | | | |
|---|---|---|---|
| 5,162,933 A | 11/1992 | Kakuda et al. | |
| 5,317,433 A | 5/1994 | Miyawaki et al. | |
| 5,339,181 A | 8/1994 | Kim et al. | |
| 5,462,887 A | 10/1995 | Gluck | |
| 5,668,379 A | 9/1997 | Ono et al. | |
| 5,731,856 A | 3/1998 | Kim et al. | |
| 5,771,083 A | 6/1998 | Fujihara et al. | |
| 5,793,460 A | 8/1998 | Yang | |
| 5,835,177 A * | 11/1998 | Dohjo et al. | 349/147 |
| 5,847,781 A | 12/1998 | Ono et al. | |
| 6,639,639 B2 * | 10/2003 | Baek et al. | 349/113 |
| 2002/0071086 A1 * | 6/2002 | Kim et al. | 349/152 |
| 2002/0109811 A1 * | 8/2002 | Park et al. | 349/113 |
| 2003/0007114 A1 * | 1/2003 | Kim et al. | 349/113 |
| 2003/0030768 A1 * | 2/2003 | Sakamoto et al. | 349/113 |
| 2003/0081159 A1 * | 5/2003 | Ha et al. | 349/113 |
| 2003/0095224 A1 * | 5/2003 | Asakura et al. | 349/143 |
| 2003/0160921 A1 * | 8/2003 | Nakashima et al. | 349/113 |
| 2003/0197181 A1 * | 10/2003 | Yun | 257/72 |
| 2004/0207784 A1 * | 10/2004 | Lim et al. | 349/114 |

FOREIGN PATENT DOCUMENTS

| | | | |
|---|---|---|---|
| JP | 2004-145024 A | 5/2004 | |
| JP | 2005-259371 A | 9/2005 | |

* cited by examiner

*Primary Examiner* — David Nelms
*Assistant Examiner* — Lauren Nguyen
(74) *Attorney, Agent, or Firm* — McKenna Long & Aldridge, LLP

(57) ABSTRACT

The present invention relates to a transflective thin film transistor substrate and method of fabricating the same. A liquid crystal display device according to the present invention includes: a gate line crossing a data line with a gate insulating film there between to define a pixel area; a thin film transistor connected to the gate line and the data line; an organic film on the gate line, the data line and the thin film transistor, having a transmission hole passing through the gate insulating film in the pixel area; a pixel electrode on the organic film via the transmission hole and connected to the thin film transistor; and a reflective electrode having an edge part different from an edge part of the pixel electrode on the pixel electrode and exposing the pixel electrode of the transmission hole.

8 Claims, 28 Drawing Sheets

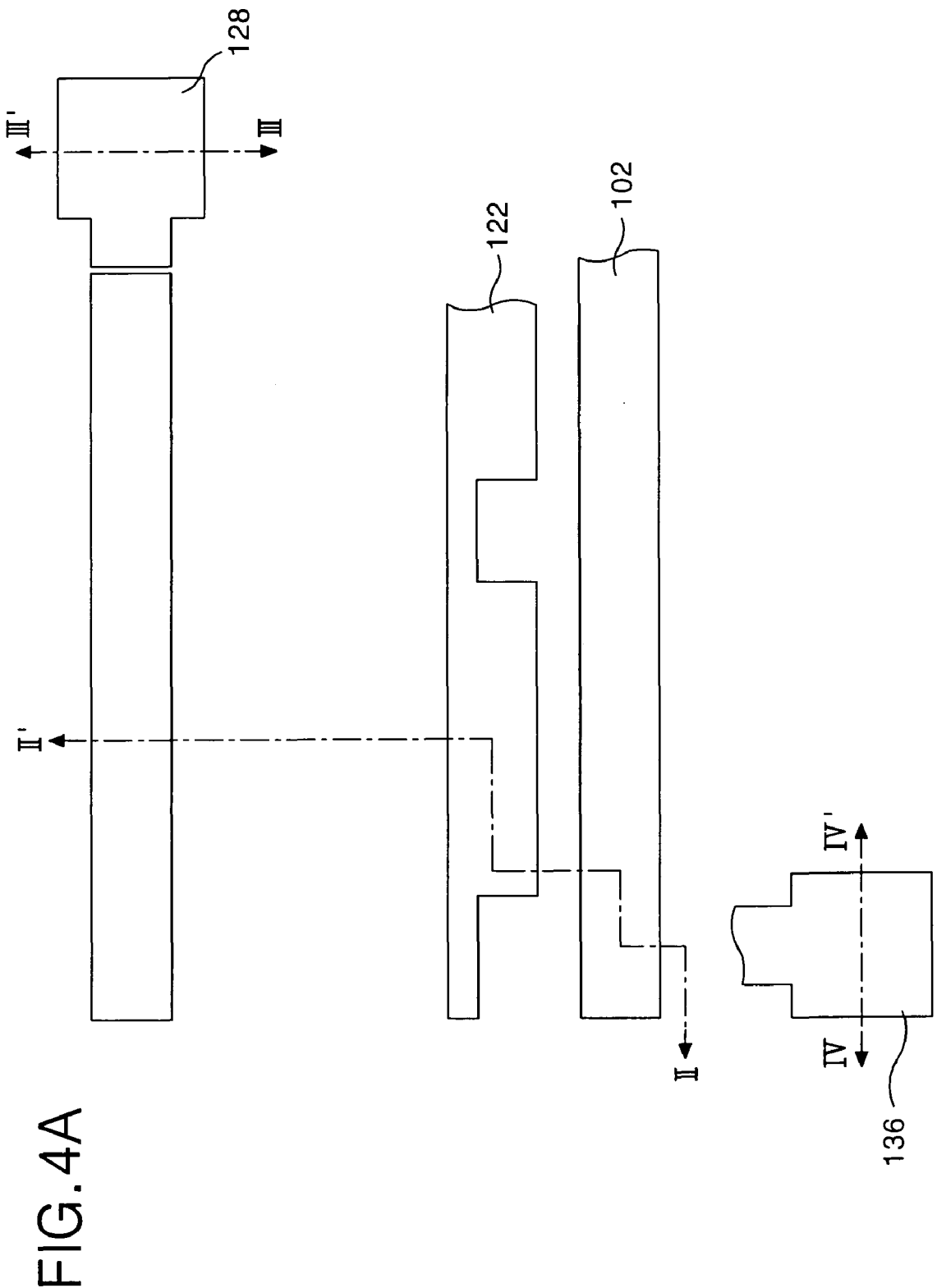

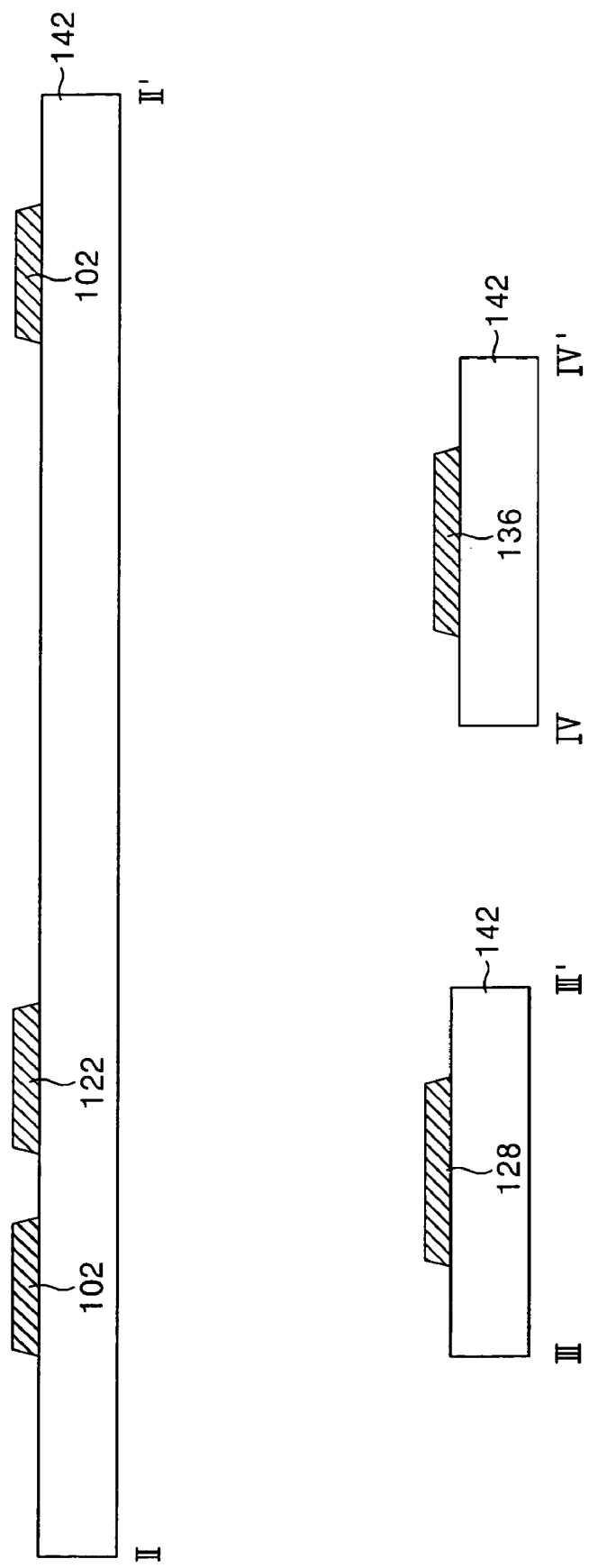

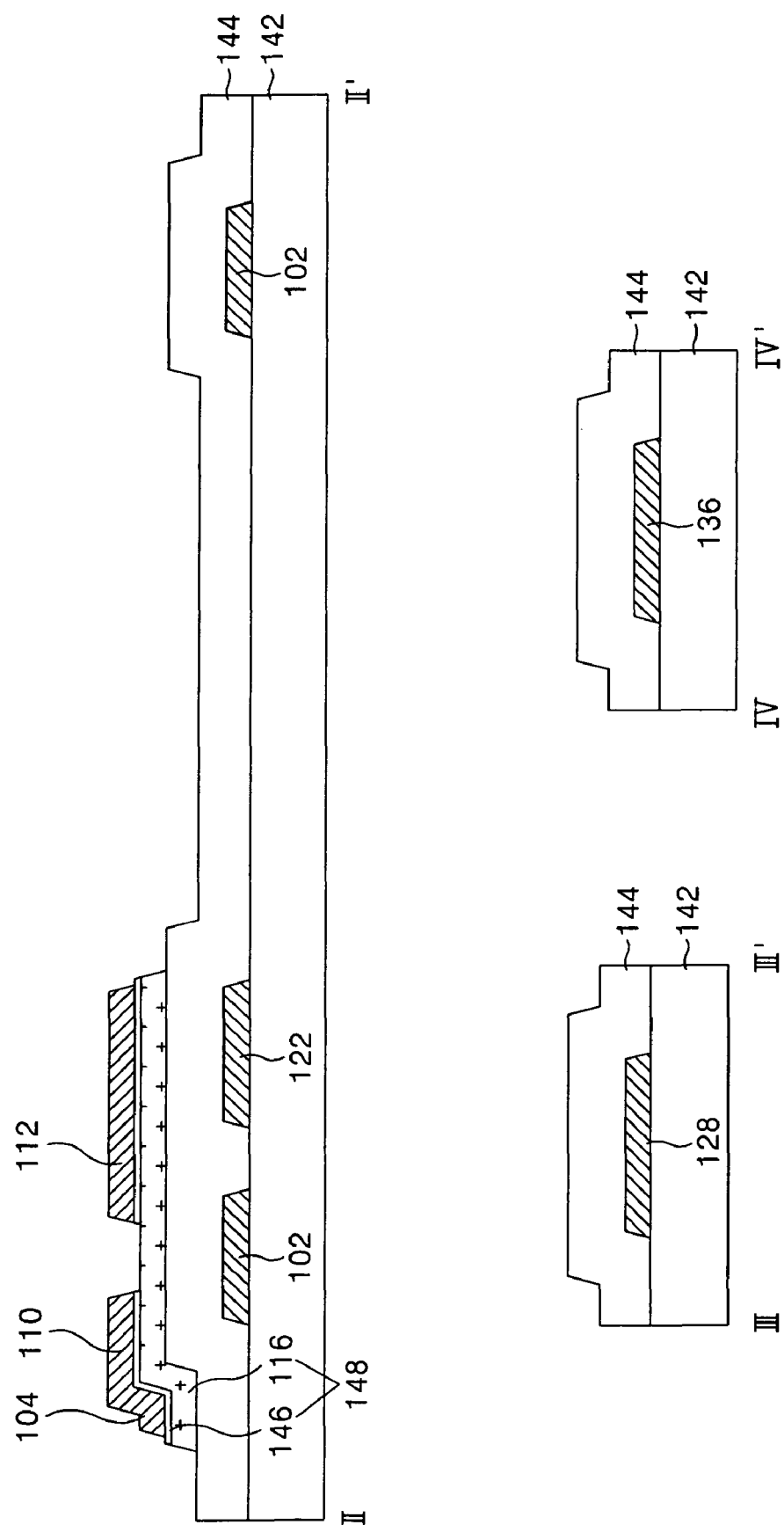

TRANSFLECTIVE THIN FILM TRANSISTOR SUBSTRATE OF LIQUID CRYSTAL DISPLAY DEVICE HAVING A CONTACT ELECTRODE CONNECTING A DATA LINK TO A DATA LINE

This application claims the benefit of the Korean Patent Application No. 2004-101553 filed on Dec. 4, 2004, which is hereby incorporated by reference for all purposes as if fully set forth herein.

BACKGROUND OF THE INVENTION

1. Field of the Invention

The present invention relates to a transflective thin film transistor substrate of a liquid crystal display device, and more particularly, to a transflective thin film transistor substrate and method of fabricating the same that is adaptive for simplifying its process.

2. Discussion of the Related Art

A liquid crystal display device controls the light transmissivity of liquid crystal, which has dielectric anisotropy, using electric field, thereby displaying a picture. For this, the liquid crystal display device includes a liquid crystal display panel to display a picture through a liquid crystal cell matrix, and a drive circuit to drive the liquid crystal display panel.

Referring to FIG. 1, a related art liquid crystal display panel includes a color filter substrate 10 and a thin film transistor substrate 20 which are bonded together with each other having a liquid crystal material 24 therebetween.

The color filter substrate 10 includes a black matrix 4, a color filter 6 and a common electrode 8 which are sequentially formed on an upper glass substrate 2. The black matrix 4 is formed on the upper glass substrate 2 in a matrix shape. The black matrix 4 divides the area of the upper glass substrate 2 into a plurality of cell areas in which a color filter is to be formed, and prevents the optical interference and external light reflection between the adjacent cells. The color filter 6 is divided into red R, green G, blue B in the cell area by the black matrix 4 to transmit red, green and blue lights respectively. The common electrode 8 supplies a common voltage Vcom to a transparent conductive layer, which is spread over the entire surface of the color filter 6, wherein the common voltage Vcom becomes a reference when driving the liquid crystal 24. And, to flatten the color filter 6, an overcoat layer (not illustrated) is additionally formed between the color filter 6 and the common electrode 8.

The thin film transistor substrate 20 includes a thin film transistor 18 and a pixel electrode 22, wherein the thin film transistor 18 is formed every cell area which is defined by the cross of a gate line 14 and a data line 16 in a lower glass substrate 12. The thin film transistor 18 supplies a data signal from the data line 16 to the pixel electrode 22 in response to a gate signal from the gate line 14. The pixel electrode 22 formed of a transparent conductive layer supplies the data signal from the thin film transistor 18 to drive the liquid crystal 24.

The liquid crystal material 24 having dielectric anisotropy rotates along the electric field formed by the common voltage Vcom of the common electrode 8 and the data signal of the pixel electrode 22 to control the light transmissivity, thereby making the gray level realized. The liquid crystal display panel further includes a spacer (not illustrated) to maintain the cell gap between the color filter substrate 10 and the thin film transistor substrate 20.

The color filter substrate 10 and the thin film transistor substrate 20 of the liquid crystal display panel are formed using a plurality of mask processes. One mask process includes a plurality of processes such as a thin film deposition (coating) process, a cleaning process, a photolithography process (hereinafter, referred to as a photo process), an etching process, a photo-resist peeling process, an inspection process and so on. In particular, the thin film transistor substrate includes the semiconductor process and requires a plurality of mask processes, thus its manufacturing process is complicated so that it becomes a material cause for the increase of the liquid crystal display panel manufacturing cost.

A liquid crystal display devices is generally classified into a transmissive type having a picture displayed using the light being incident from a backlight unit, a reflective type having a picture displayed by reflecting an external light such as a natural light, and a transflective type using an advantage of both the transmissive type and the reflective type.

There is a problem that the power consumption of a backlight unit is high in the transmissive type while the reflective type depends on the external light so as not to be able to display the picture in a dark environment. On the other, the transflective liquid crystal display device operates in the reflective mode if the external light is sufficient and in the transmissive mode if the external light is not sufficient, thus it can reduce the power consumption more than the transmissive liquid crystal display device and it is not restricted by the availability external light, which is different from the reflective liquid crystal display device.

To this end, the transflective liquid crystal display panel includes each pixel divided into a reflection area and a transmission area. Accordingly, a reflection electrode, formed in the reflection area, and an insulating film for making light paths in both the reflection area and the transmission area the same should be further added in a transflective thin film transistor, as compared to the thin film transistor as illustrated in FIG. 1. As a result, because the number of mask processes must be increased, there is a problem that the manufacturing process of the related art transflective thin film transistor substrate is complex.

SUMMARY OF THE INVENTION

Accordingly, it is an advantage of the present invention to provide a transflective thin film transistor substrate and method of fabricating the same that is adaptive for simplifying its process.

In order to achieve these and other advantages of the invention, liquid crystal display device according to an embodiment of the present invention includes: a gate line; a data line crossing the gate line with a gate insulating film there between, to define a pixel area; a thin film transistor connected to the gate line and the data line; an organic film on the gate line, the data line and the thin film transistor, having a transmission hole passing through the gate insulating film in the pixel area; a pixel electrode on the organic film via the transmission hole and connected to the thin film transistor; and a reflective electrode having an edge part different from an edge part of the pixel electrode on the pixel electrode and exposing the pixel electrode of the transmission hole.

A method of fabricating a liquid crystal display device according to an embodiment of the present invention includes: a first mask process forming a gate line on a substrate; a second mask process forming a gate insulating film on the gate electrode, a semiconductor pattern on the gate insulating film, a data line crossing the gate line to define a pixel area on the semiconductor pattern, a source electrode, and a drain electrode; a third mask process forming an organic film on the data line, the source electrode and the drain electrode, and a transmission hole passing through the organic film and the gate insulating film; a fourth mask process forming a pixel electrode on the organic film of the pixel area via the transmission hole, connected to the drain electrode; and a fifth mask process forming a reflective electrode in the pixel area to expose the pixel electrode of the transmission hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 4A and 4B are a plane view and a sectional view in order to describe a first mask process of the transflective thin film transistor substrate according to the embodiment of the present invention;

FIGS. 5A and 5B are a plane view and a sectional view in order to describe a second mask process of the transflective thin film transistor substrate according to the embodiment of the present invention;

DETAILED DESCRIPTION OF THE ILLUSTRATED EMBODIMENT

Reference will now be made in detail to embodiments of the present invention, examples of which are illustrated in the accompanying drawings.

Hereinafter, the illustrated embodiments of the present invention will be described in detail with reference to FIGS. 2 to 15B.

Figure 1:
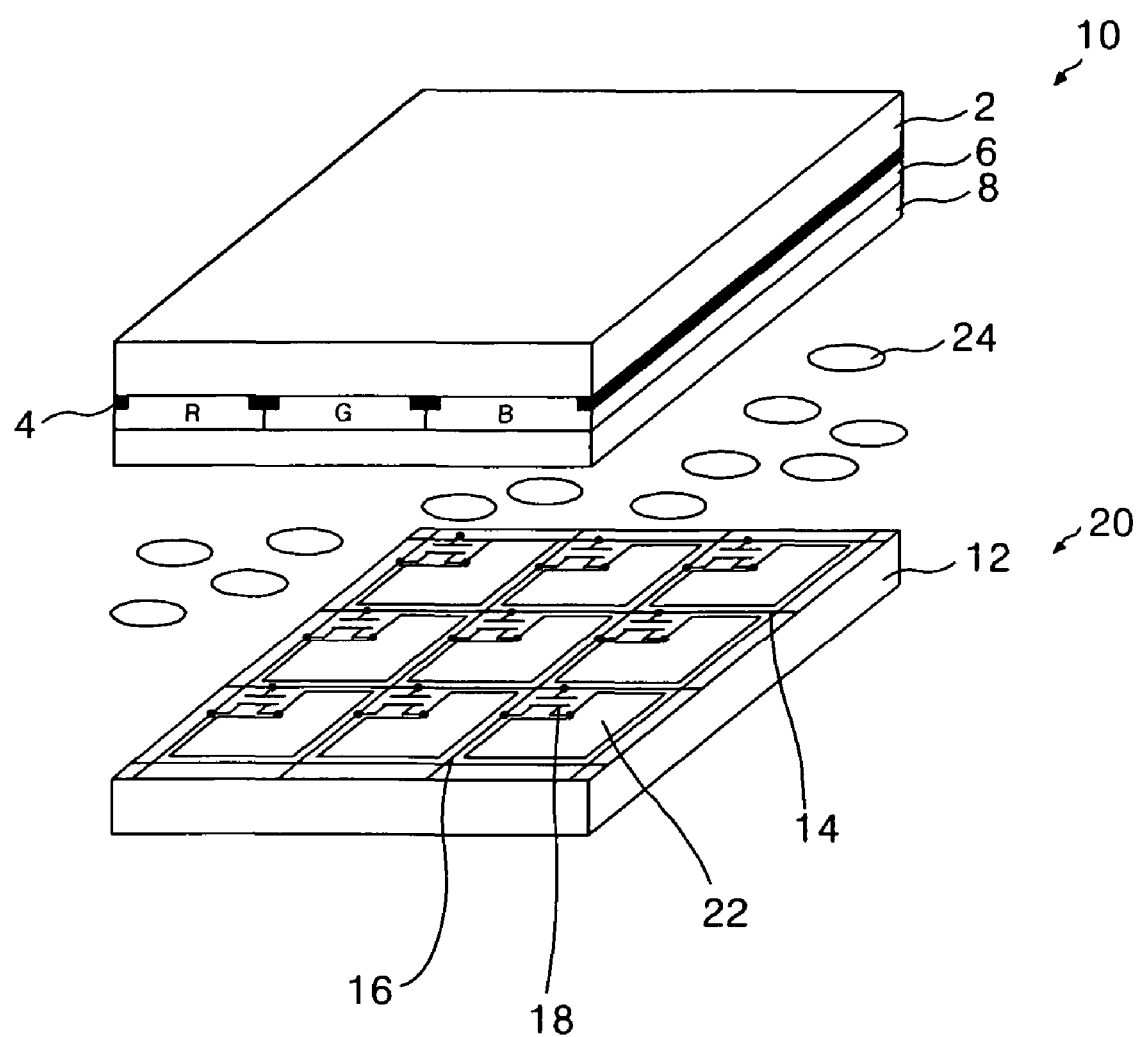
FIG. 1 is a perspective view illustrating a structure of a related art liquid crystal display panel.
Figure 2:
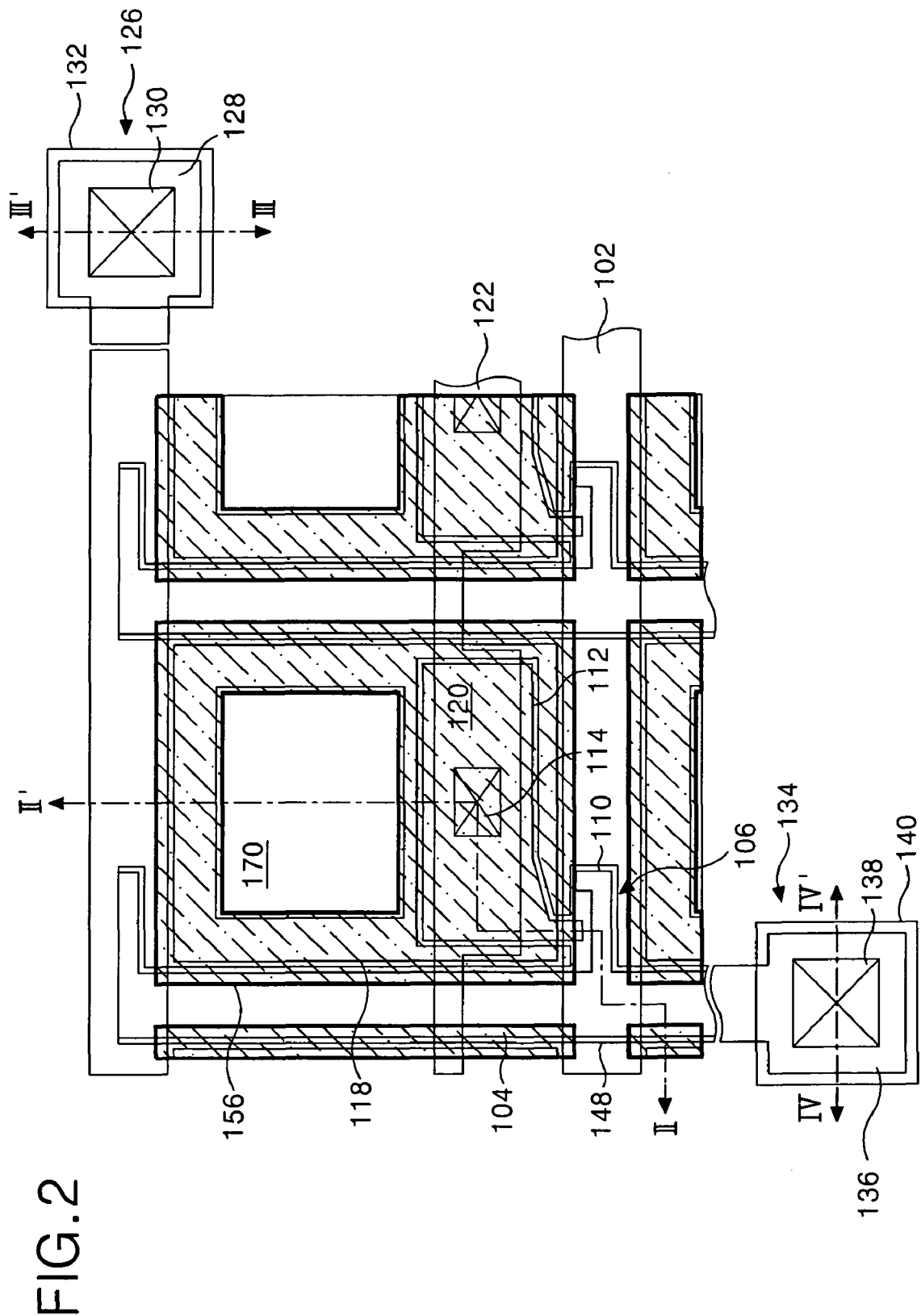
FIG. 2 is a plane view partially illustrating a part of a transflective thin film transistor substrate according to an embodiment of the present invention.
Figure 3A:
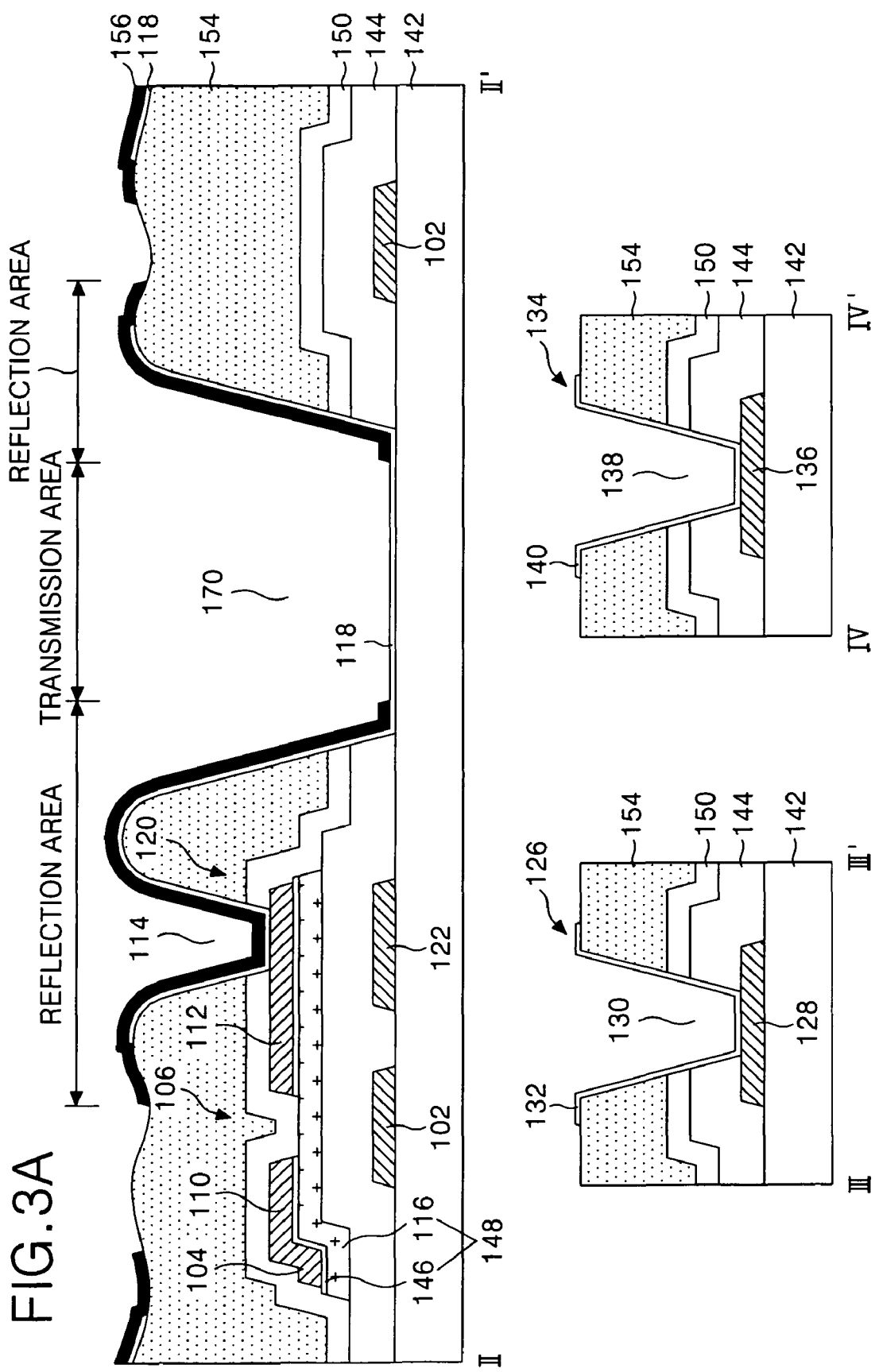
FIGS. 3A and 3B are sectional views illustrating the transflective thin film transistor substrate taken along the line II-II', III-III, IV-IV' illustrated in FIG. 2.
Figure 3B:
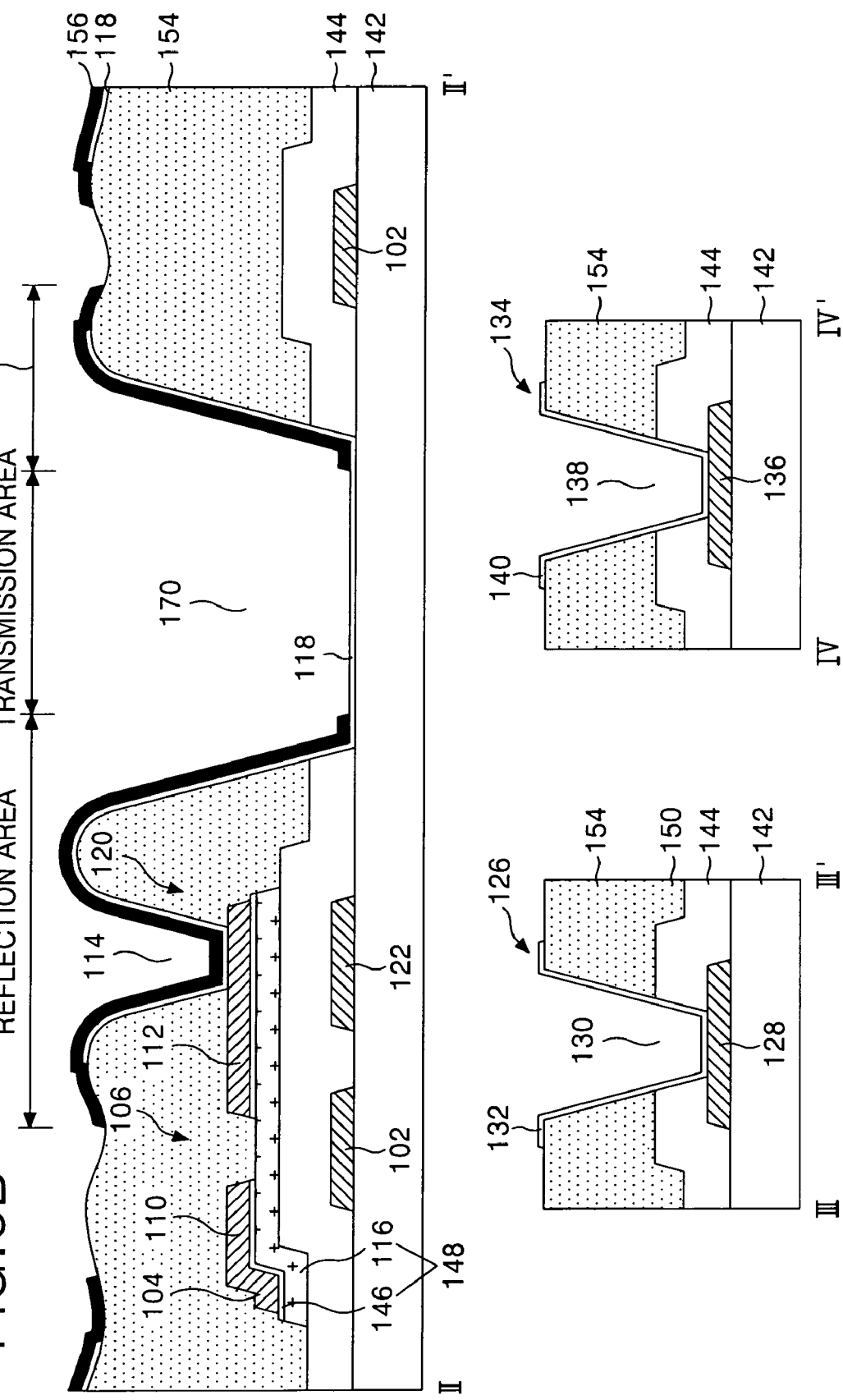

FIG. 2 is a plane view partially illustrating a transflective thin film transistor substrate according to the first embodiment of the present invention, and FIGS. 3A and 3B are sectional views illustrating the transflective thin film transistor substrate taken along the lines II-II', III-III, IV-IV' illustrated in FIG. 2.

Referring to FIGS. 2 and 3, the transflective thin film transistor substrate includes: a gate line 102 and a data line 104 that define a pixel area on a lower substrate 142 by crossing each other with a gate insulating film 144 therebetween; a thin film transistor 106 connected to the gate line 102 and the data line 104; a pixel electrode 118 formed at each pixel area and connected to the thin film transistor 106; and a reflection electrode 156 formed to be overlapped with the pixel electrode 118 at a reflection area of each pixel. Accordingly, each pixel area is divided into a reflection area having the reflection electrode 156 and a transmission area having the pixel electrode 118 exposed through an open part.

The thin film transistor 106 responds to the scan signal of the gate line 102 to make pixel signal supplied to the data line 104 is charged in the pixel electrode 118 to be kept. For this, the thin film transistor 106 includes the gate line 102; a source electrode 110 connected to the data line 104; a drain electrode 112 that faces the source electrode 110 and is connected to the pixel electrode 118; an active layer 116 which overlaps the gate line 102 with the gate insulating film 144 to form a channel between the source electrode 110 and the drain electrode 112; and an ohmic contact layer 146, making an ohmic contact with the active layer 116, the source electrode 110 and the drain electrode 112 except a channel part. A semiconductor pattern 148 including the active layer 116 and the ohmic contact layer 146 is formed to overlap the data line 104.

The pixel electrode 118 is formed at each pixel area defined by the crossing of a gate line 102 and a data line 104. More specifically, the pixel electrode 118 is formed on an organic insulating film 154 of each pixel area, passing through a drain contact hole 114 passing through the organic insulating film 154 and the passivation film 150 and a transmission hole 170 passing through from the organic insulating film 154 to the gate insulating film 144. Accordingly, the pixel electrode 118 is connected to the drain electrode 112 via the drain contact hole 114 and connected to the substrate 142 via the transmission hole 170. Further, the pixel electrode 118 overlaps the reflection electrode 156 formed on the pixel electrode 118 in the reflection area, and is exposed via an open part of the reflection electrode 156 to transmit light in the transmission area. The pixel electrode 118 generates a potential difference with the common electrode of the color filter substrate (not illustrated) by the pixel signal supplied through the thin film transistor 106. The liquid crystal having dielectric anisotropy is rotated by this potential difference to control the transmissivity of the light which goes through the liquid crystal layer of the reflection area and the transmission area, thus varying the brightness in accordance with the video signal.

The reflection electrode 156 is formed at the reflection area of each pixel to reflect an external light. More specifically, the reflection electrode 156 defines the transmission area by exposing the pixel electrode 118 formed in the transmission hole 170 and defines the reflection area by capturing the remaining part of the pixel electrode 118, in which the remaining part of the pixel electrode 118 surrounds the transmission area. The reflection electrode 156 is formed separated from the reflection electrode 156 of the adjacent pixel on the signal line (i.e. the data line 104 or the gate line 102). In this connection, an edge part of the reflection electrode 156 is formed to be placed to an outer part from the edge part of the pixel electrode 118. The reflection electrode 156 has the embossing shape along the surface of the organic insulating film 154 together with the pixel electrode 118, thus its reflection efficiency increases due to its dispersion effect.

The transmission hole 170 is formed to pass through a relatively thick organic insulating film 154. Accordingly, the length of the light path that runs through the liquid crystal layer becomes the same at the reflection area and the transmission area, thus the transmission efficiency of the reflection mode and the transmission mode becomes the same.

The thin film transistor substrate of the present invention further includes a storage capacitor 120 connected to the drain electrode 112 in order to stably maintain the video signal supplied to the pixel electrode 118. An enlarged drain electrode 112 overlaps the storage line 122 parallel to the gate line 102 with the gate insulating film 144 there between to form the storage capacitor. In this connection, the semiconductor pattern is further overlapped under the drain electrode 112 overlapping the storage line 122. The pixel electrode 118 is connected to the drain electrode 112 via the contact hole 114 on the storage line 122.

The gate line 102 is connected to a gate driver (not illustrated) through the gate pad 126. The gate pad 126 includes a lower gate pad electrode 128 extended from the gate line 102 and an upper gate pad electrode 132 connected to the lower gate pad electrode 128 via a first contact hole 130 passing from the organic insulating film 154 to the gate insulating film 144.

The data line 104 is connected to a data driver (not illustrated) through the data pad 134. The data pad 134 is formed with the structure like the gate pad 126 described above. More specifically, the data pad 134 includes a lower data pad electrode 136 formed on the substrate 142 and an upper data pad electrode 140 connected to the lower data pad electrode 136 via a second contact hole 138 passing from the organic insulating film 154 to the gate insulating film 144. The data pad 134 is connected to the data line 104, formed together with the semiconductor pattern 148 on the gate insulating film 144, through a separate contact electrode (not illustrated).

The passivation film 150 illustrated in FIG. 3A may be omitted as illustrated in FIG. 3B.

The thin film transistor according to the embodiment of the present invention is formed by the following five mask processes.

FIGS. 4A and 4B are a plane view and a sectional view explaining a first mask process in a fabricating method of the thin film transistor substrate according to the embodiment of the present invention.

A gate pattern is formed by a first mask process, wherein the gate pattern includes the gate line 102, the storage line 122, the lower gate pad electrode 128 connected to the gate line 102, and the lower data pad electrode 136, on the lower substrate 142.

More specifically, a gate metal layer is formed by a deposition method such as sputtering. The gate metal layer is formed in a single layer structure of Mo, Cu, Al, Ti, Cr, Mo alloy, Al alloy such as AlNd, or Cu alloy. By way of an alternative, the gate metal layer is formed in a plurality of layer structure more than a double structure such as Al/Cr, Al/Mo, Al(Nd)/Al, Al(Nd)/Cr, Mo/Al(Nd)Mo, Cu/Mo, Ti/Al(Nd)/Ti, Mo/Al, Mo/Ti/Al(Nd), Cu alloy/Mo, Cu alloy/Al, Cu alloy/Mo alloy, Cu alloy/Al alloy, Al/Mo ally, Mo alloy/Al, Al alloy/Mo alloy, Mo alloy/Al alloy. Subsequently, the gate metal layer is patterned by a photolithography process using the first mask and an etching process, to thereby form a gate metal pattern including the gate line 102, the storage line 122, the lower gate pad electrode 128, and the lower data pad electrode 136.

Figure 5A:
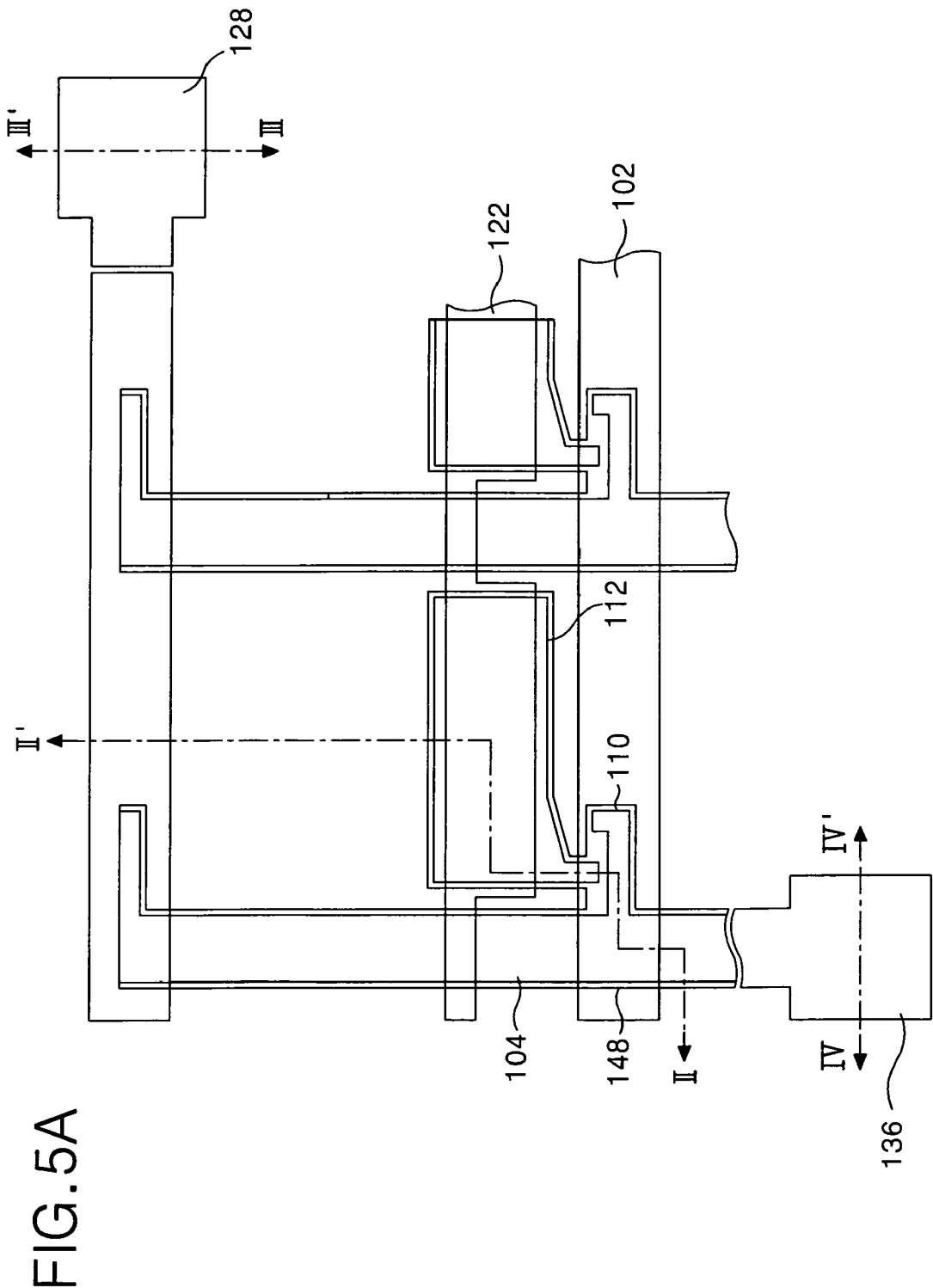

FIGS. 5A and 5B are a plane view and a sectional view respectively illustrating a second mask process of the transflective thin film transistor substrate according to the embodiment of the present invention.

The gate insulating film 144 is formed on the lower substrate 142 where the gate metal pattern is formed. And, a source/drain pattern including the data line 104, the source electrode 110 and the drain electrode 112, and a semiconductor pattern 148 including the active layer 116 and the ohmic contact layer 146 that overlap along the rear surface of the source/drain pattern are formed on the gate insulating film 144 by a second mask process. The semiconductor pattern 148 and the source/drain pattern are formed by one mask process using a diffractive exposure mask or a half-tone mask. Hereinafter, for example, an only case using the diffractive exposure mask will be described as follows.

Specifically, the gate insulating film 144, an amorphous silicon layer, an amorphous silicon layer doped with impurities n+ or p+, a source/drain metal layer are sequentially formed on the lower substrate 142 where the gate pattern is formed. For example, the gate insulating film 144, the amorphous silicon layer, the amorphous silicon layer doped with impurities are formed by PECVD, and the source/drain metal layer is formed by sputtering. The gate insulating film 144 is formed of inorganic insulating material such as silicon oxide SiOx, silicon nitride SiNx, and the source/drain metal layer is formed in a single structure of Mo, Cu, Al, Ti, Cr, Mo alloy, Al alloy such as AlNd, or Cu alloy. Or, the gate insulating film 144 is formed in a plurality of layer structure more than a double structure such as Al/Cr, Al/Mo, Al(Nd)Al, Al(Nd)/Cr, Mo/Al(Nd)Mo, Cu/Mo, Ti/Al(Nd)/Ti, Mo/Al, Mo/Ti/Al(Nd), Cu alloy/Mo, Cu alloy/Al, Cu alloy/Mo alloy, Cu alloy/Al alloy, Al/Mo ally, Mo alloy/Al, Al alloy/Mo alloy, Mo alloy/Al alloy.

And a photo-resist pattern having a stepped difference is formed on the source/drain metal layer by a photolithography process using a diffractive exposure mask. The photo-resist pattern has a relatively thicker thickness at an area where the semiconductor pattern and the source/drain pattern should be formed and a relatively thinner thickness at an area where the channel of the thin film transistor is formed.

A source/drain metal pattern and the semiconductor pattern thereunder are formed by an etching process using the photo-resist pattern having the stepped difference. The source/drain pattern includes the data line 104, the drain electrode 122 integrated with the source electrode 110.

The thin part of the photo-resist pattern is then removed and the thick part of the photo-resist pattern becomes thinner, by an ashing process. By an etching process using the ashed photo-resist pattern, the source electrode 110 is separated from the drain electrode 112, and the ohmic contact layer 146 under the source electrode 110 and the drain electrode 112 is eliminated. Subsequently, the photo-resist pattern remaining on the source/drain metal pattern is removed by a strip process.

Figure 6A:
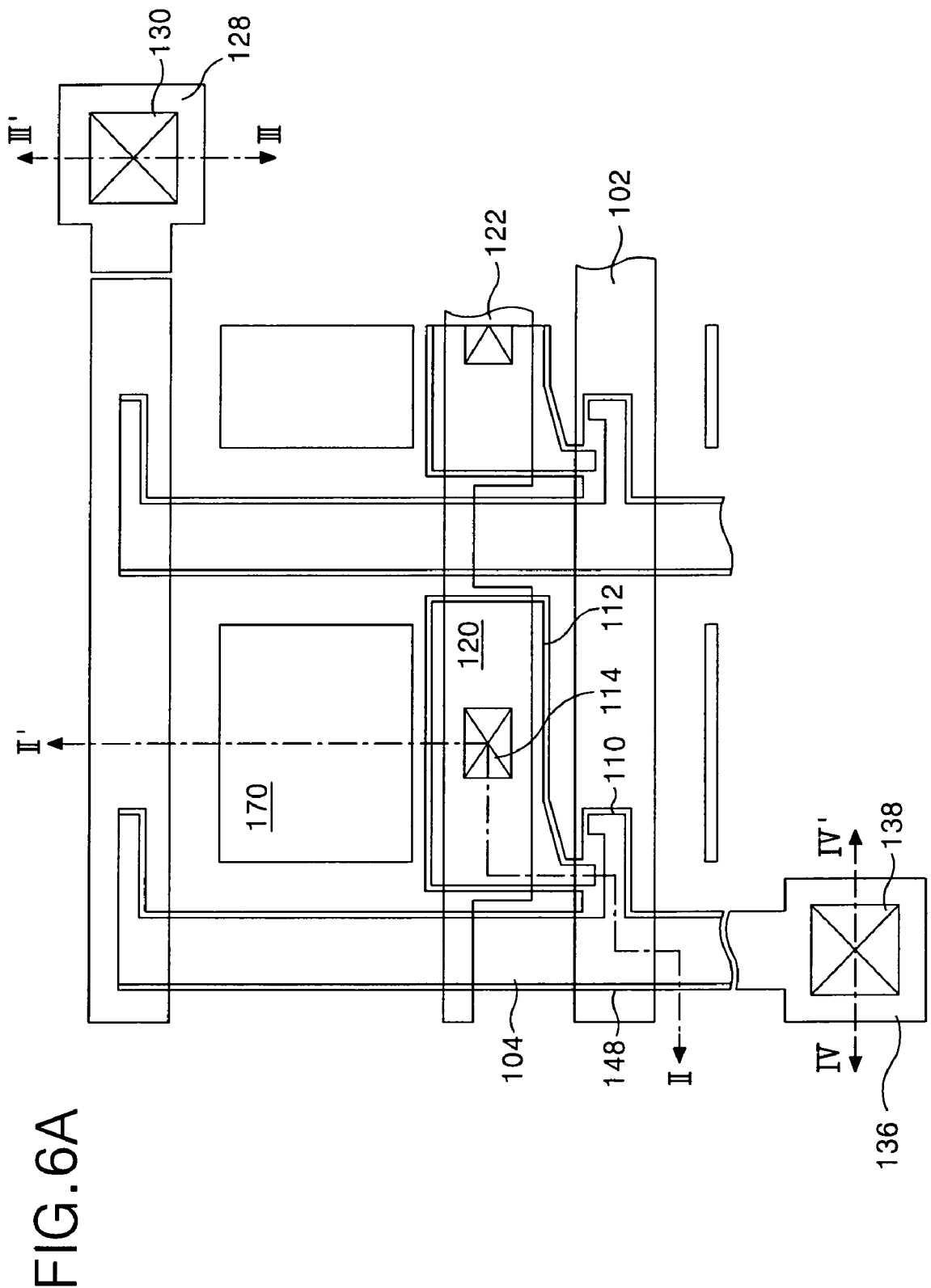
FIGS. 6A and 6B are a plane view and a sectional view in order to describe a third mask process of the transflective thin film transistor substrate according to the embodiment of the present invention.
Figure 6B:
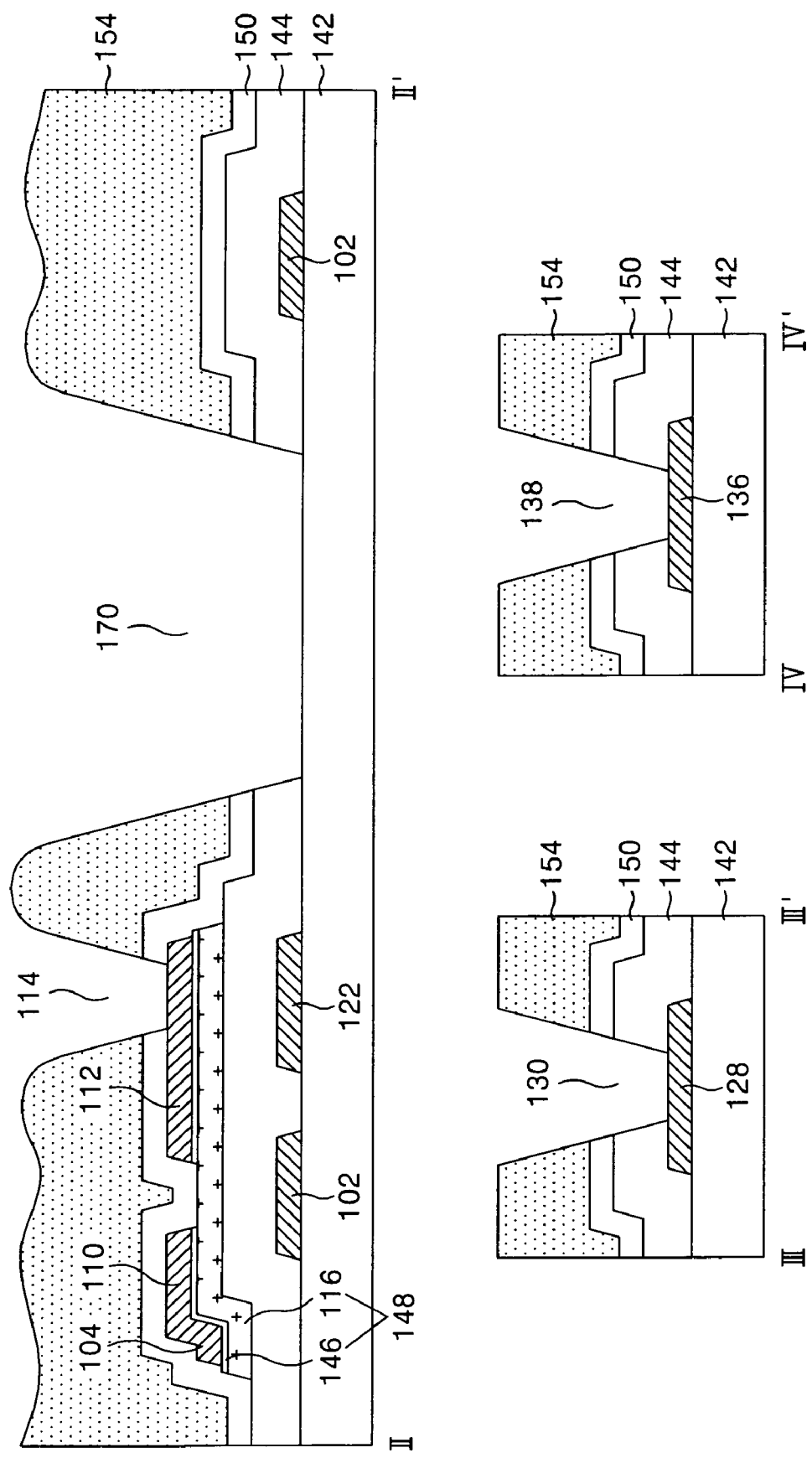

FIGS. 6A and 6B are a plane view and a sectional view respectively illustrating a third mask process of the transflective thin film transistor substrate according to the embodiment of the present invention.

The passivation film 150 covering the source/drain metal pattern and the organic film 154 are formed, and the transmission hole 170, the drain contact hole 114, the first contact hole 138 and the second contact hole 138, passing through the passivation film 150 and the organic film 154, are formed, using the third mask process. The passivation film 150 can be omitted.

Specifically, passivation film 150 is formed by the deposition method such PECVD on the gate insulating film 144 where the source/drain metal pattern is formed. The passivation film 150 is formed of an inorganic insulating material like the gate insulating film 144.

Subsequently, the organic film 154, having an embossing surface at the reflection area and having the transmission hole 170, the drain contact hole 114, the first contact hole 130 and the second contact hole 138, is formed on the passivation film 150. The organic film 154 is formed on the passivation film 150 by coating a photosensitive organic material such as acrylic resin using a spin coating method. Then the organic film 154 is patterned by the photolithography process using the third mask, thereby forming the transmission hole 170, the drain contact hole 114, the first contact hole 130 and the second contact hole 138 which passes through the organic film 154 in correspondence to the transmission part of the third mask. Further, the third mask has a structure where a shielding part and a diffractive exposure part (or a transflective part) repeat at the rest area except for the transmission part. The organic film 154 corresponding to the above structure is patterned to have a structure with a shielding area (projected part) and a diffractive exposure area (groove part), having a stepped difference at the reflection area being repeated. Subsequently, the organic film 154 where the projected part and the groove part are repeated is cured so that the surface of the organic film 154 has the embossing shape.

The passivation film 150 and the gate insulating film 144 under the organic film 154 are patterned by using the organic film 154 as a mask, so that the transmission hole 170, the first contact hole 130 and the second contact hole 138 are extended to pass to the gate insulating film 144, and the drain contact hole 114 is extended to pass to the passivation film 150.

Figure 7A:
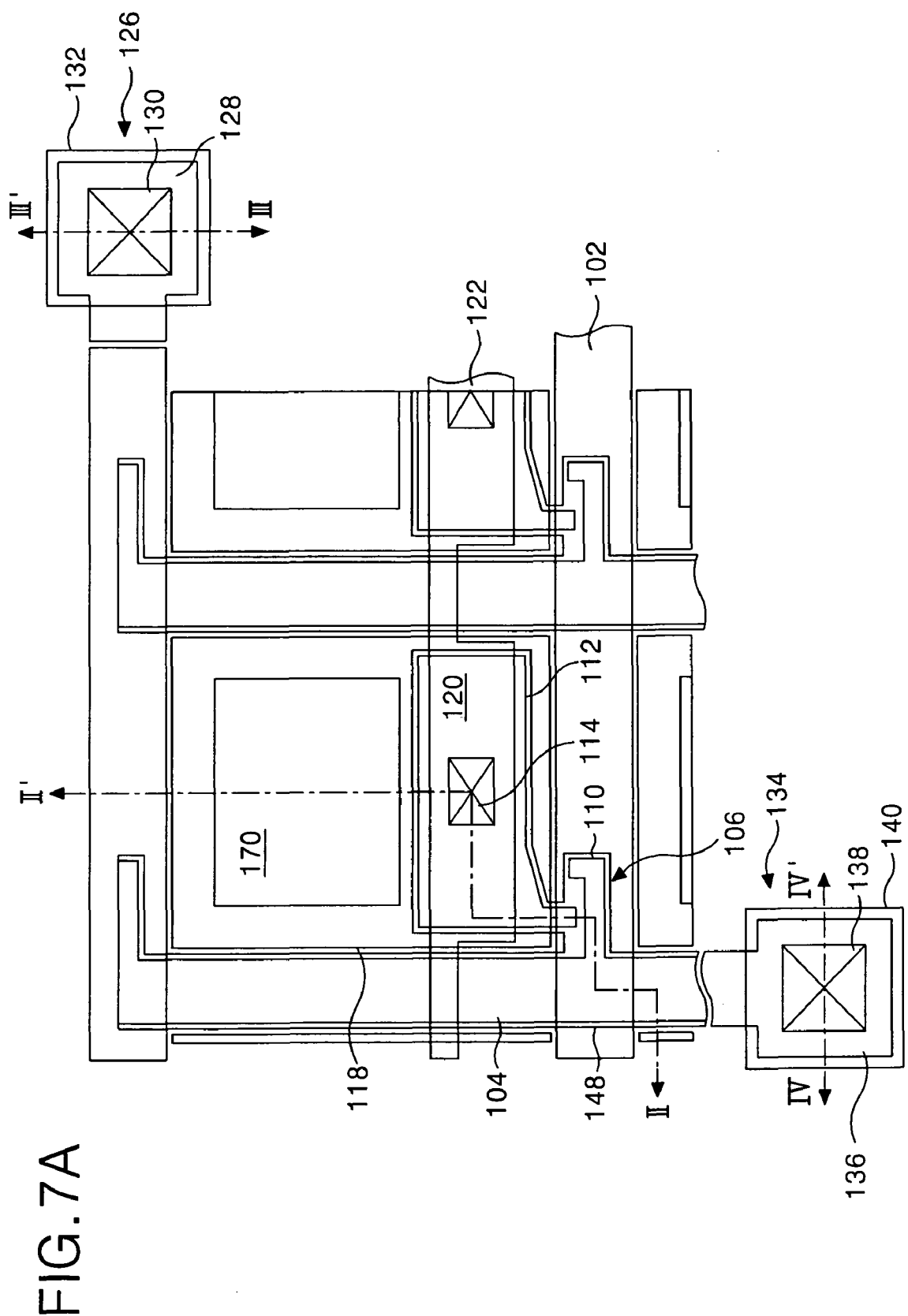
FIGS. 7A and 7B are a plane view and a sectional view in order to describe a fourth mask process of the transflective thin film transistor substrate according to the embodiment of the present invention.
Figure 7B:
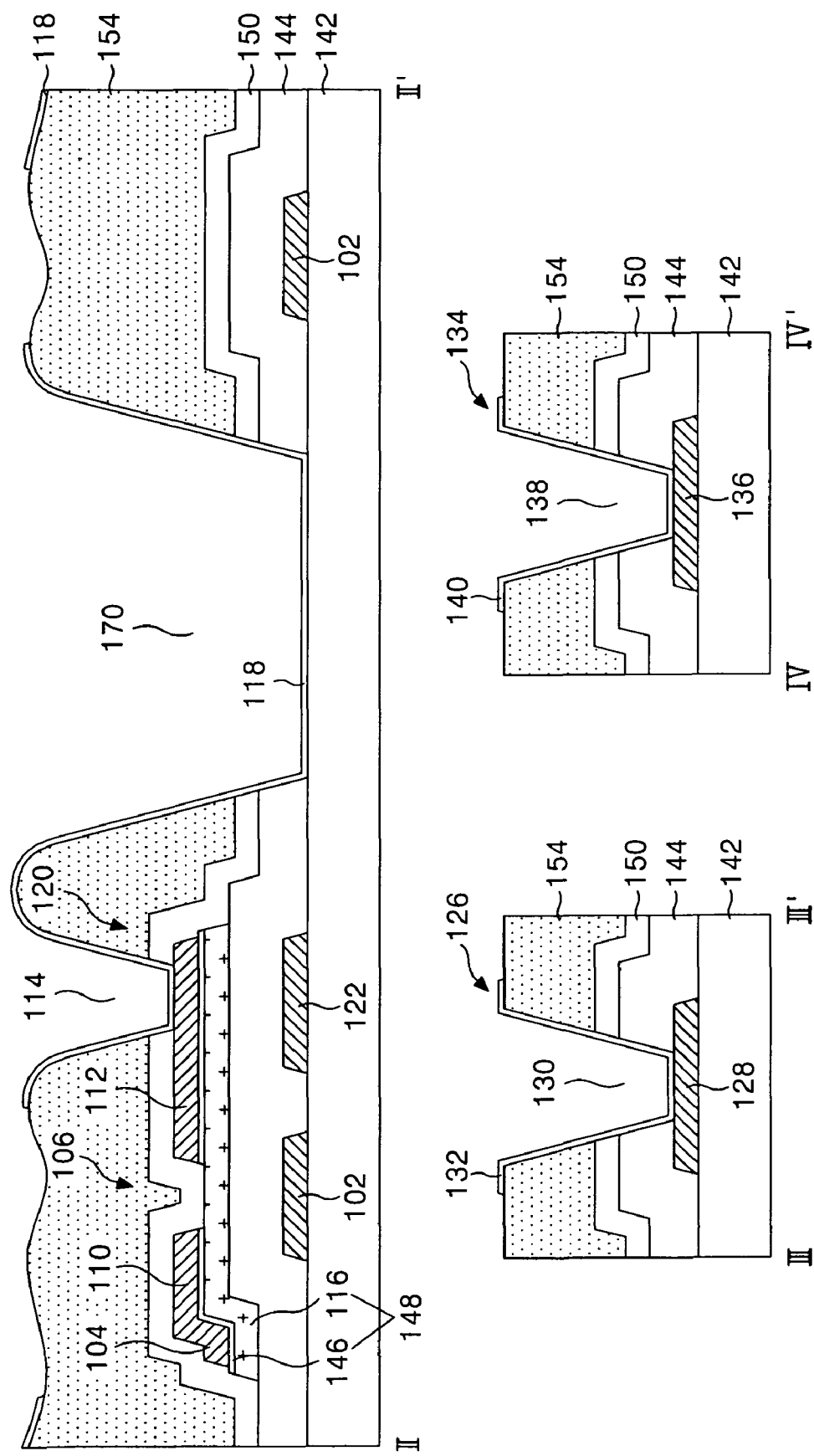

FIGS. 7A and 7B are a plane view and a sectional view illustrating a fourth mask process of the transflective thin film transistor substrate according to the embodiment of the present invention.

A transparent conductive pattern, including the pixel electrode 118, the upper gate pad electrode 132 and the upper data pad electrode 140, is formed on the organic film 154 having the embossing shape.

Specifically, a transparent conductive film is formed to cover the organic film 154 by a deposition method such as sputtering. The transparent conductive film is formed of ITO, TO, IZO, ITZO and the like. Subsequently, the transparent conductive film is patterned by a photolithography using the fourth mask and an etching process, thereby forming the transparent conductive pattern including the pixel electrode 118, the upper gate pad electrode 132 and the upper data pad electrode 138. The pixel electrode 118 is formed to be overlap with the organic film 154 via the transmission hole 170 at the pixel area, and is connected to the drain electrode via the drain contact hole 114. In this connection, since the surface of the organic film 154 has the embossing shape, the pixel electrode 118 formed on the organic film 154 has an embossing shape. The upper gate pad electrode 132 and the upper data pad electrode 140 are respectively connected to the lower gate pad electrode 128 and the lower data pad electrode 136 to via the first contact hole 130 and the second contact hole 138.

Figure 8A:
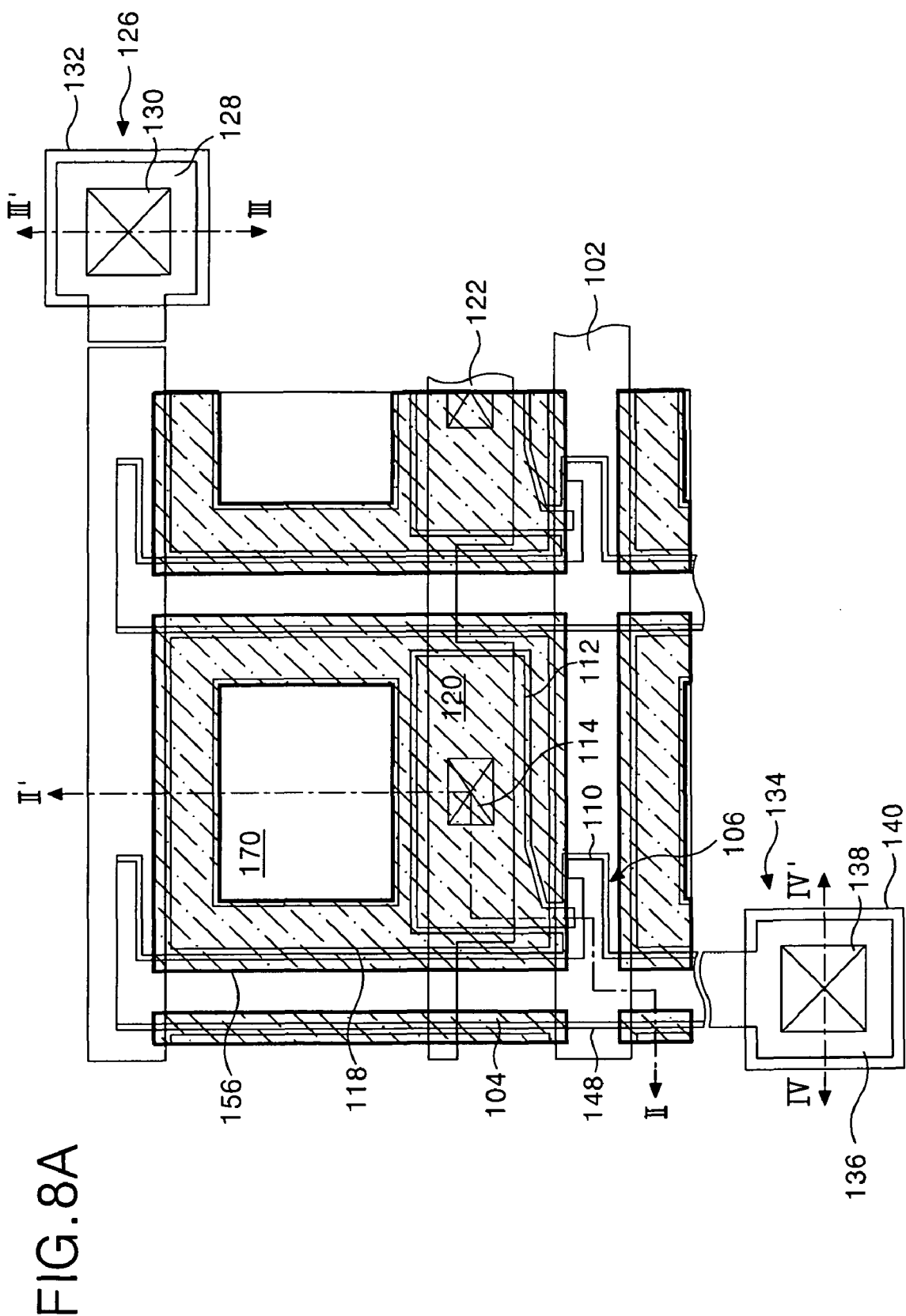
FIGS. 8A and 8B are a plane view and a sectional view in order to describe a fifth mask process of the transflective thin film transistor substrate according to the embodiment of the present invention.
Figure 8B:
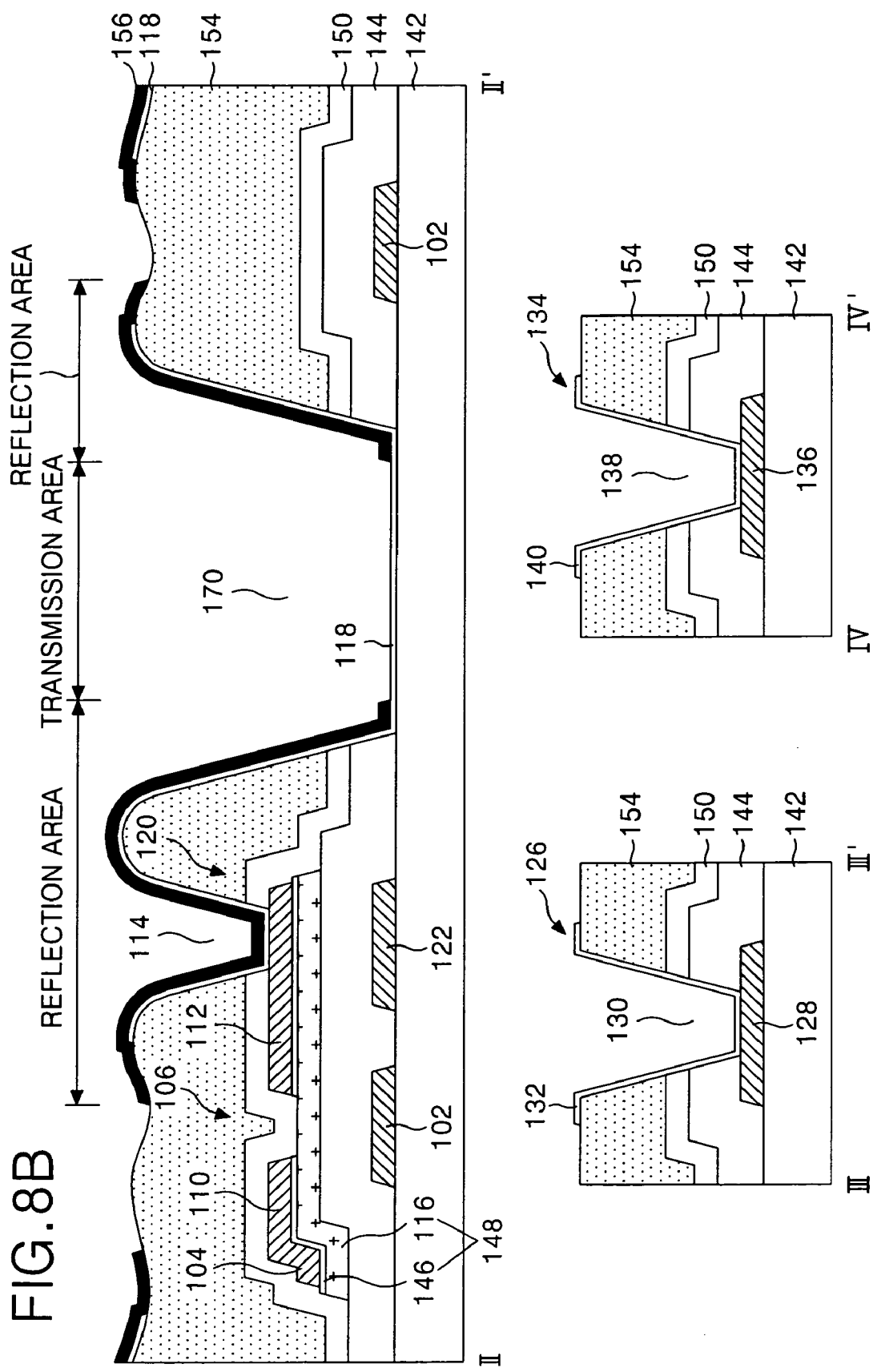

FIGS. 8A and 8B are a plane view and a sectional view illustrating a fifth mask process of the thin film transistor substrate according to the embodiment of the present invention.

The reflection electrode 156 is formed on the pixel electrode 118 using the fifth mask process.

Specifically, a reflection metal layer is formed on the organic film 148 having an embossing surface and the organic film 154 by a deposition method such as sputtering, and the reflection metal layer maintains the embossing shape. The reflection metal layer is formed of a metal having a high reflectivity like Al and AlNd, or is formed in a double structure such as AlNd/Mo and the like. Subsequently, the reflection metal layer is patterned by the photolithography process using the fifth mask and the etching process, thereby forming the reflection electrode 156 covering the pixel electrode 118 at the reflection area. The reflection electrode 156 is independent in every pixel unit and is opened in the transmission hole 170 to expose the pixel electrode 118. The reflection electrode 156 is connected to the pixel electrode 118 thereunder. The edge part of the reflection electrode 156 is formed to be placed at an outer side from the edge part of the pixel electrode 118.

Accordingly, the method of fabricating the transflective thin film transistor substrate according to the embodiment of the present invention is possible to simplify processes by performing five mask processes.

Figure 9:
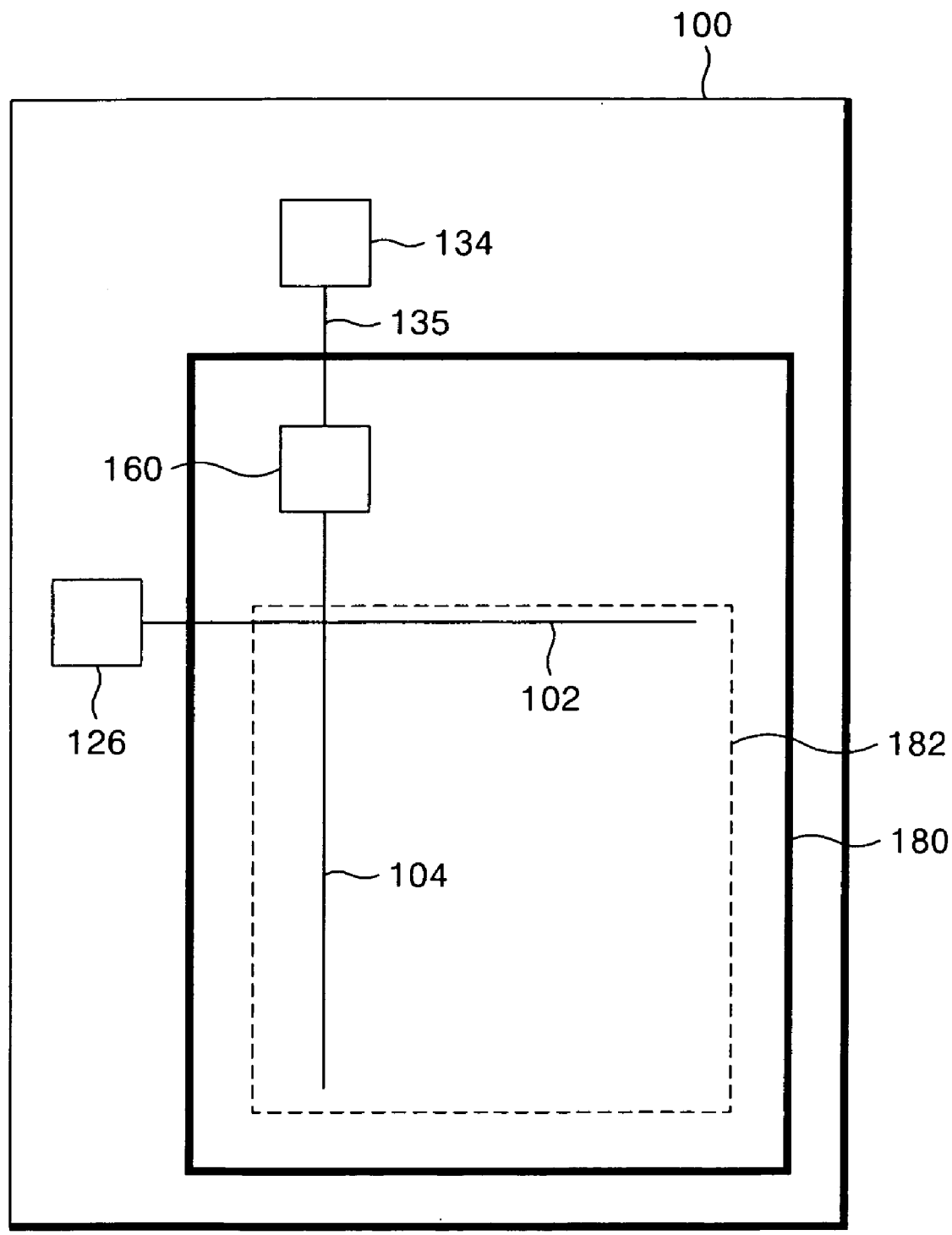
FIG. 9 is a plane view briefly illustrating the transflective thin film transistor substrate according to the embodiment of the present invention, with a surrounding part centered.

FIG. 9 is a plane view briefly illustrating the transflective thin film transistor substrate according to the present invention, with a surrounding part.

The transflective thin film transistor substrate 100 illustrated in FIG. 9 includes a contact electrode 160 in order to connect the data pad 134 formed in the same layer as the gate pad 126 to the data line 104. In other words, the contact electrode 160 connects a data link 135 extended from the data pad 134, to the data line 104. The contact electrode 160 is formed of the same metal layer as the pixel electrode 118 formed at an active area 182, is formed of the same reflection metal layer as the reflection electrode 156, or is formed in a double structure which the transparent conductive film and the reflection metal layer are stacked. Herein, if the contact electrode 160 is formed of the reflection metal layer to be exposed to an exterior, then there occurs a problem that the contact electrode 160 is corroded. Thus, it is located at an area which is sealed by a sealant 180, i.e., between the sealant 180 and an active area 182. Accordingly, it is possible to prevent the corrosion of the contact electrode 160.

Figure 10A:
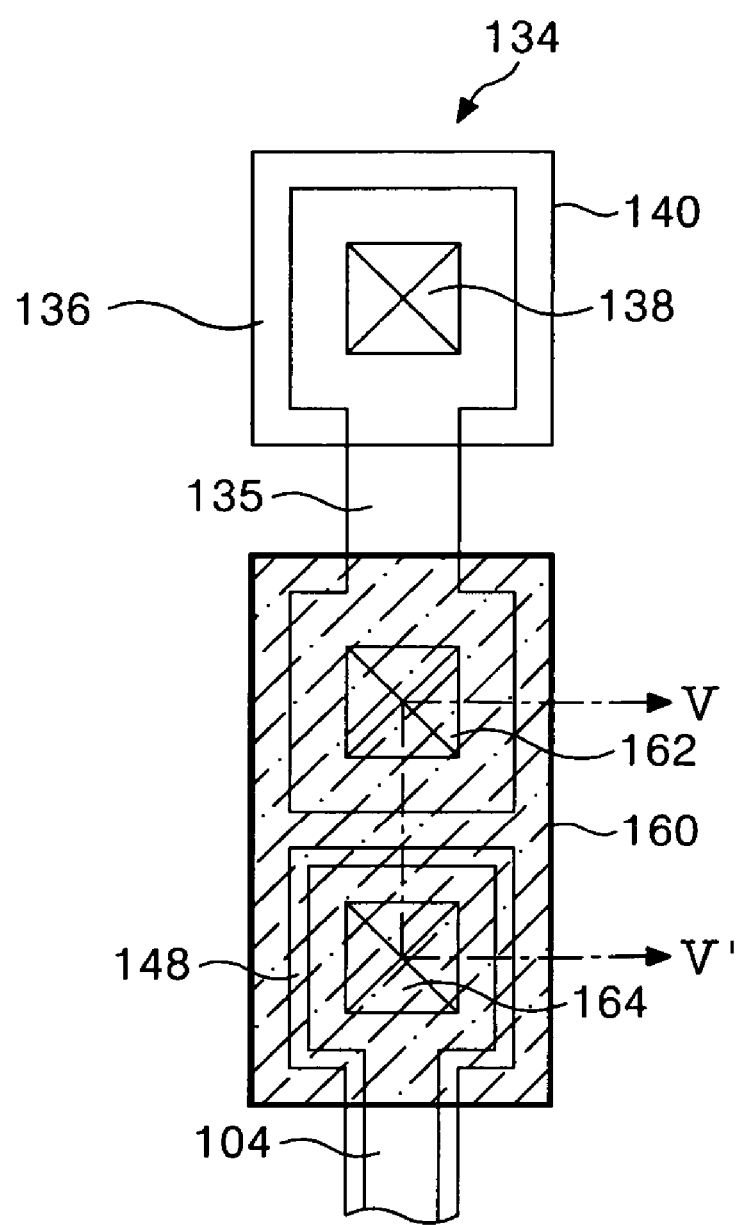
FIGS. 10A to 10C are a plane view and sectional views specifically illustrating a contact area of a data link and a data line illustrated in FIG. 9.
Figure 10B:
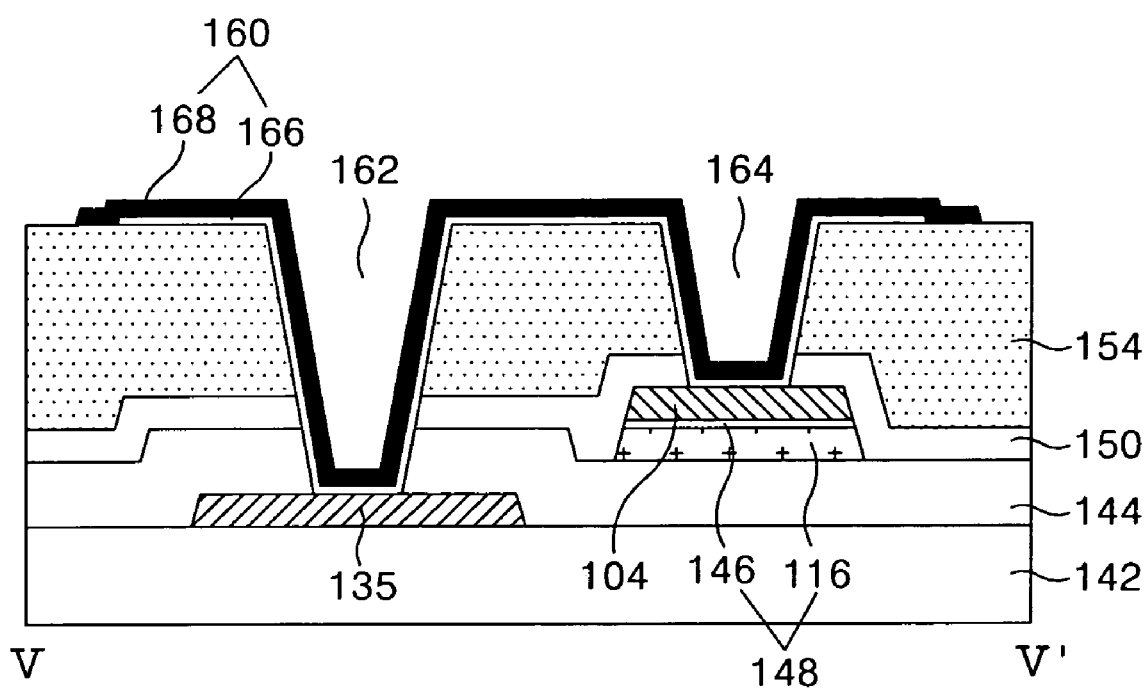
Figure 10C:
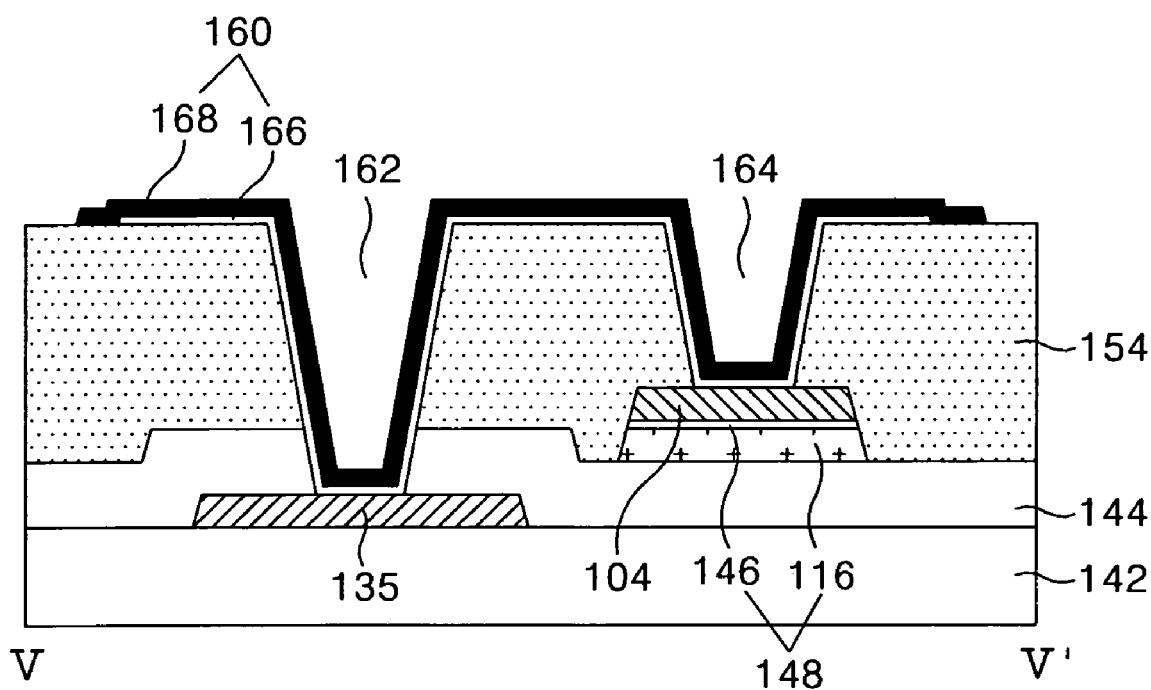

FIG. 10A is an enlarged plane view illustrating a contact area of the data line 104 and a data link 135, FIG. 10B is a sectional view illustrating the contact area taken along the line V-V', VI-VI' in FIG 10A, and FIG 10C is another sectional view illustrating the contact area in FIG. 10A.

Referring to FIGS. 10A and 10B, the data link 135 is adjacent to the data line 104 or overlapped with the data line 104. The data line 104 is extended from the data pad 134, i.e., the lower data pad electrode 136 and is located at the area which is to be sealed by the sealant 180.

A third contact hole 162 passes from the organic film 154 to the gate insulating film 144 to expose the data link 135, and a fourth contact hole 164 passes from the organic film 154 and the passivation film 150 to expose the data line 104.

The contact electrode 160 includes a first contact electrode 166 formed of the transparent conductive film like the upper data pad electrode 140 and a second contact electrode formed of the reflection metal layer to capture the first contact electrode 166. Different from this, the contact electrode 160 can be formed of only first contact electrode 166, or can be formed of only second contact electrode 168. The contact electrode 160 connects the data link 135 to the data line 104 via the third and the fourth contact hole 162 and 164.

The passivation film 150 illustrated in FIG 10B can be omitted as illustrated in FIG. 10C.

The surrounding part of the transflective thin film transistor, i.e., the contact area of the data line 104 and the data link 135, is formed by performing the fifth mask process as described above. This will be described with reference to FIGS. 11A to 15B.

Figure 11A:
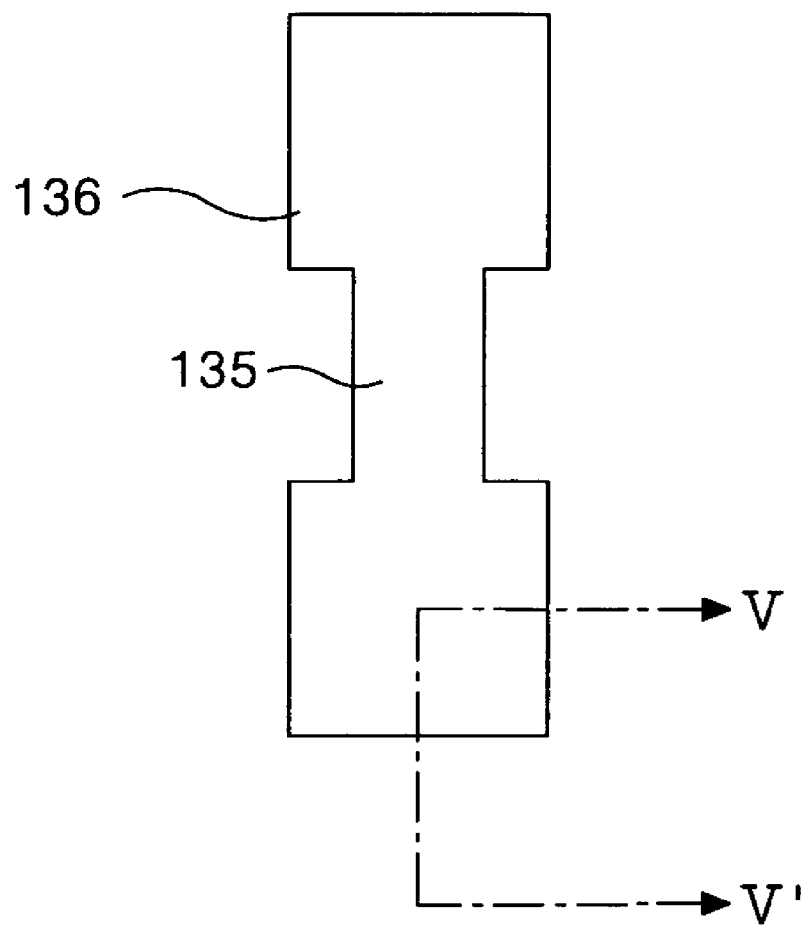
FIGS. 11A and 11B are a plane view and a sectional view in order to describe a first mask process of the transfiective thin film transistor substrate illustrated in FIGS. 10A and 10B.
Figure 11B:
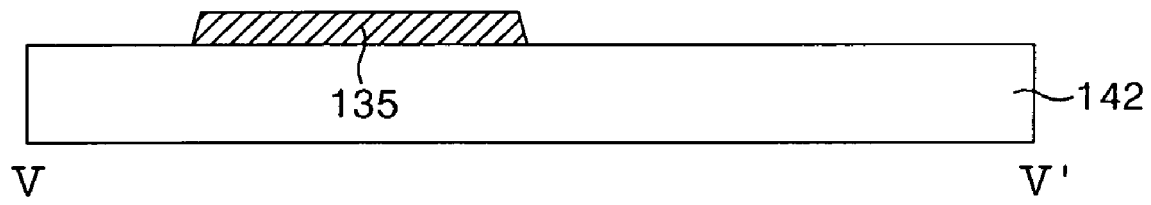

Referring to FIGS. 11A and 11B, a gate metal pattern is formed on the lower substrate 142 by a first mask process, wherein the gate metal pattern includes the data link 135 along with the lower data pad electrode 136. The first mask process is the same as described in FIGS. 4A and 4B.

Figure 12A:
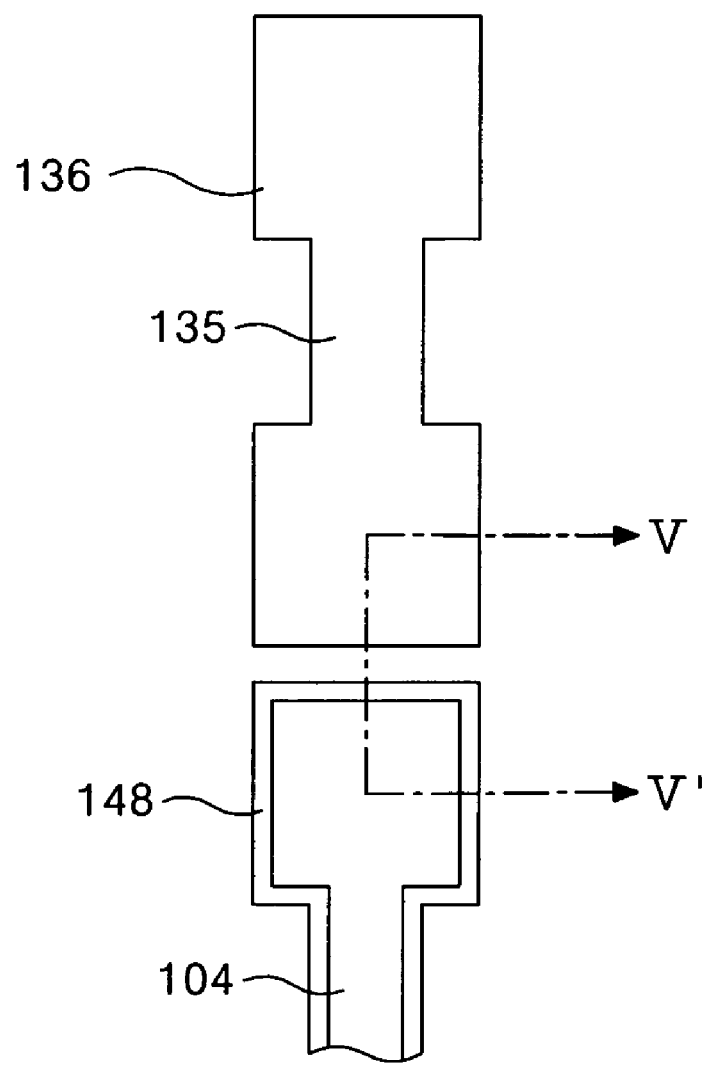
FIGS. 12A and 12B are a plane view and a sectional view in order to describe a second mask process of the transflective thin film transistor substrate in FIGS. 10A and 10B.
Figure 12B:
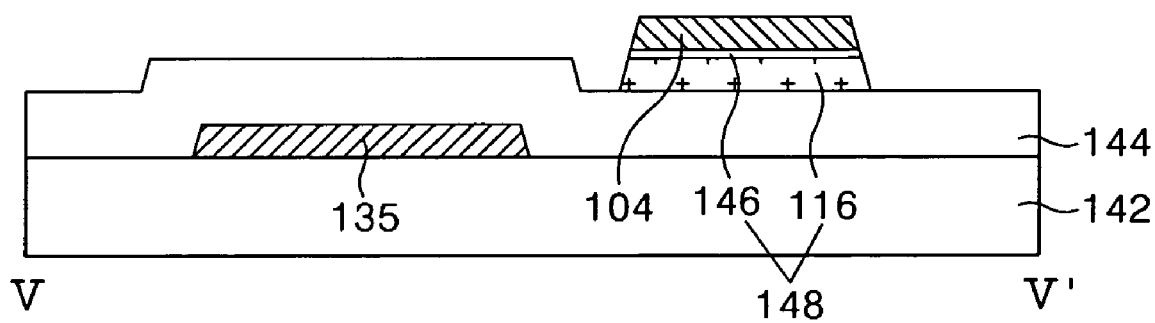

Referring to FIGS. 12A and 12B, a gate insulating film 144 is formed by a second mask process, and a semiconductor pattern 148, including an active layer 116 and an ohmic contact layer 146, and a data line 104 are stacked on the gate insulating film 144. The second mask process is the same as described in FIGS. 5A and 5B.

Figure 13A:
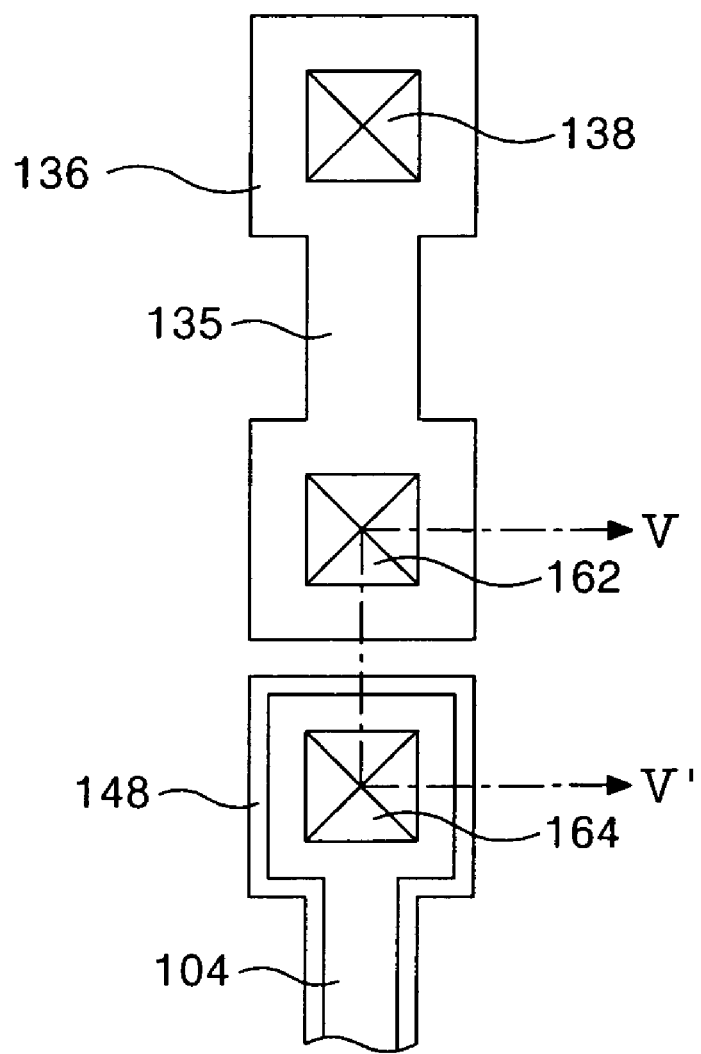
FIGS. 13A and 13B are a plane view and a sectional view in order to describe a third mask process of the transflective thin film transistor substrate in FIGS. 10A and 10B.
Figure 13B:
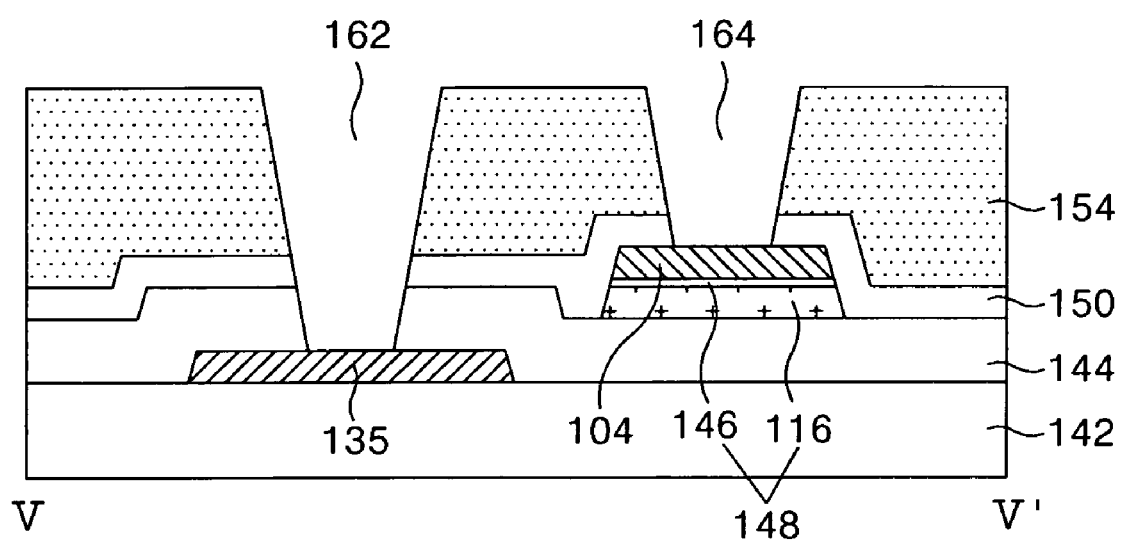

Referring to FIGS. 13A and 13B, a passivation film 150 and an organic film 154 are formed, and third and fourth contact holes 162 and 164, that passing through the passivation film 150 and the organic film 154 are formed, using a third mask process. The third contact hole 162 passes from the organic film 154 to the gate insulating film 144 to expose the data link 150, and the fourth contact hole 164 passes through the organic film 154 and the passivation film 150 to expose the data line 104. The passivation film 150 can be omitted. The third mask process is the same as described in FIGS. 6A and 6B.

Figure 14A:
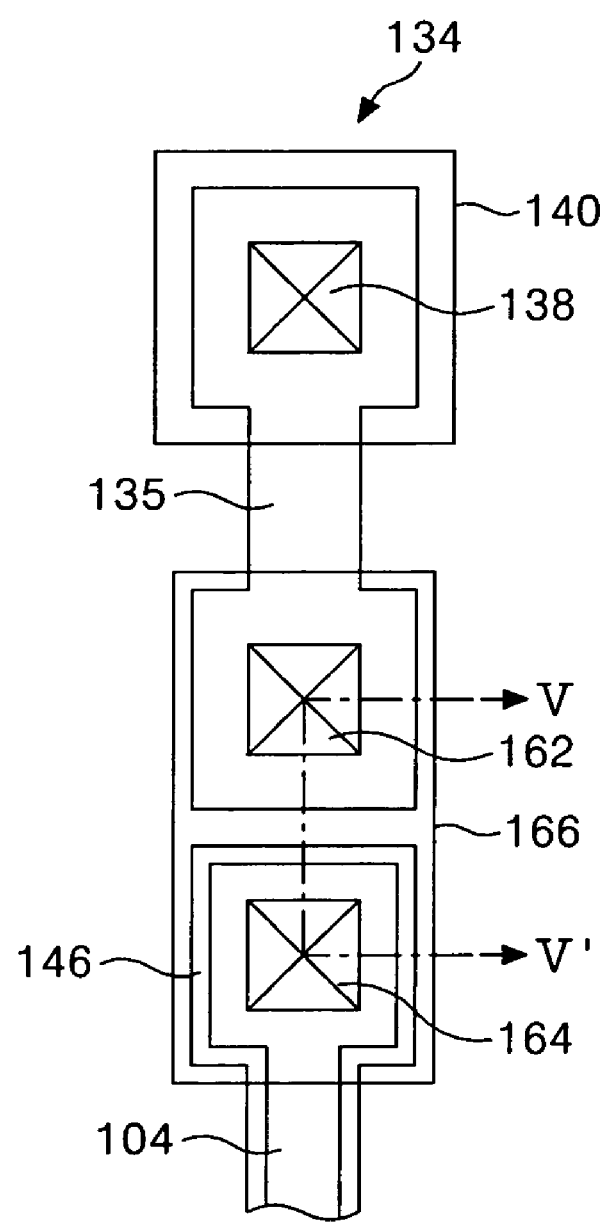
FIGS. 14A and 14B are a plane view and a sectional view in order to describe a fourth mask process of the transflective thin film transistor substrate in FIGS. 10A and 10B.
Figure 14B:
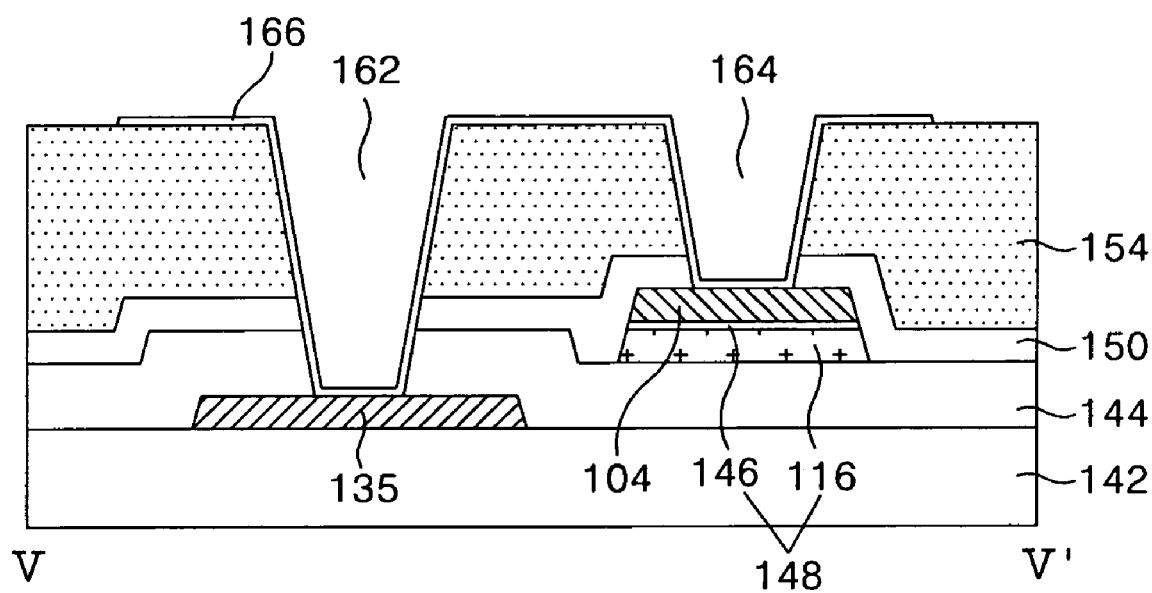

Referring to FIGS. 14A and 14B, a first contact electrode 166 is formed together with the upper data pad electrode 140 formed of the transparent conductive layer, using the fourth mask process. The first contact electrode 166 passes through the first and the second contact holes 162 and 164 to connect the data link 135 to the data line 104. The fourth mask process is the same as described in FIGS. 7A and 7B.

Figure 15A:
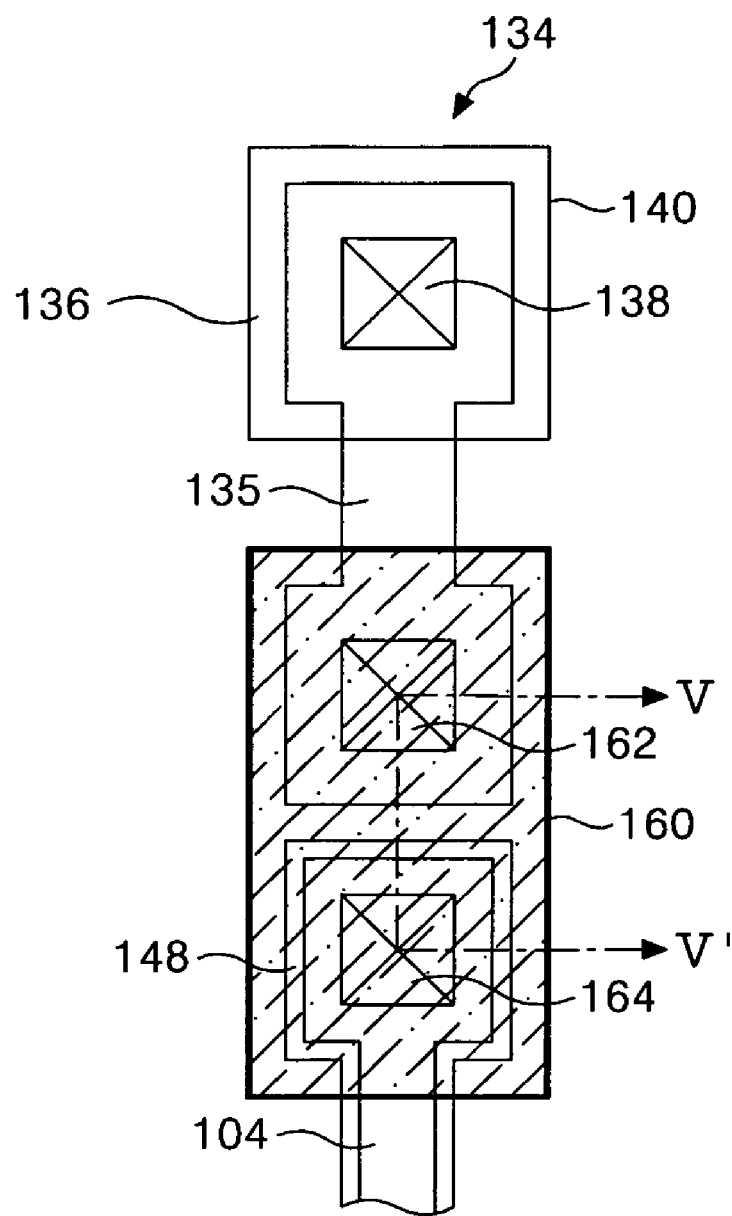
FIGS. 15A and 15B are a plane view and a sectional view in order to describe a fifth mask process of the transflective thin film transistor substrate in FIGS. 10A and 10B.
Figure 15B:
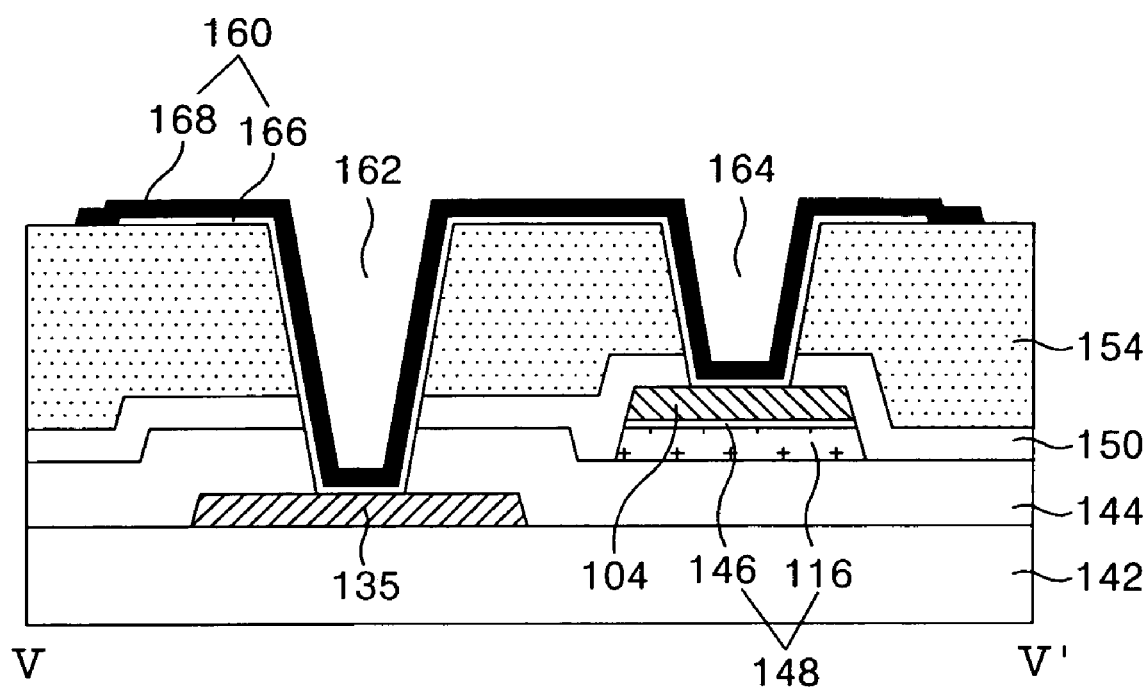

Referring to FIGS. 15A and 15B, a second contact electrode 168 including a reflection metal layer is formed using the fifth mask process. The second contact electrode 168 is formed to capture the first contact electrode 166 via the first and the second contact holes 162 and 164. In other words, the edge part of the second contact electrode 168 is formed to be placed at an outer side from the edge part of the first contact electrode 166. The fifth mask process is the same as described in FIGS. 8A and 8B.

As described above, in the transflective thin film transistor substrate and the method of fabricating method according to the present invention, the organic film is patterned and a plurality of contact holes is formed by one mask process. Thus, it is possible to simplify processes by performing five mask processes.

Further, in the transflective thin film transistor substrate and the method of fabricating method according to the present invention, the gate pad and the data pad are formed in the same structure, and the data link and the data line, formed respectively on the different layers, are connected together by the contact electrode including at least one of the transparent conductive film and the reflection metal layer. In this connection, the contact electrode is formed in the area to be sealed by the sealant, thus it is possible to prevent the corrosion problem caused by the exposure of the contact electrode formed of the reflection metal layer.

Although the present invention has been explained by the embodiments illustrated in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of fabricating a liquid crystal display device, comprising:
   a first mask process forming a gate line, a storage line parallel to the gate line, a lower gate pad electrode, a lower data pad electrode and a data link on a substrate;
   a second mask process forming a gate insulating film on the substrate on which the gate line, the storage line, the lower gate pad electrode, the lower data pad electrode and the data link are formed, and forming a semiconductor pattern on the gate insulating film, a data line crossing the gate line to define a pixel area including a transmission area and a reflection area, a source electrode and a drain electrode on the semiconductor pattern;
   a third mask process forming an organic film on the data line, the source electrode and the drain electrode, and forming a drain contact hole passing through the organic film to expose the drain electrode, a transmission hole, a first contact hole, a second contact hole and a third contact hole passing through the organic film and the gate insulating film to expose the substrate, the lower gate pat electrode, the lower data pad electrode and the data link, respectively, and a fourth contact hole passing through the organic film to expose the data line;
   a fourth mask process forming a pixel electrode on the organic film of the pixel area via the transmission hole, connected to the drain electrode, an upper gate pad electrode on the organic film to be connected with the lower gate pad electrode via the first contact hole, an upper data pad electrode on the organic film to be connected with the lower data pad electrode via the second contact hole, a first contact electrode on the organic film to be connected with the data link via the third contact hole and the data line via the fourth contact hole, wherein the pixel electrode is overlapped with the storage line; and
   a fifth mask process forming a reflective electrode in the reflection area of the pixel area to expose the pixel electrode of the transmission hole, and a second contact electrode on the first contact electrode wherein the first contact electrode includes a transparent conductive film same as the pixel electrode, and the second contact electrode includes a reflective metal layer same as the reflective electrode; wherein the reflective metal layer entirely covers the transparent conductive film so that the transparent conductive film is unexposed.

2. The method according to claim 1, wherein the second mask process further includes forming a storage capacitor including the storage line and the drain electrode, wherein the storage line overlaps with the drain electrode extended from the thin film transistor with the gate insulating film therebetween.

3. The method according to claim 1, wherein the data link is extended from the lower data pad electrode to be connected to the data line.

4. The method according to claim 1, wherein the first and second contact electrodes are in an area to be sealed by a sealant.

5. The method according to claim 1, wherein the reflective electrode is connected to the pixel electrode and is formed to cover a side surface of the transmission hole.

6. The method according to claim 1, wherein the edge part of the reflective electrode is formed to be at an outer side from the edge part of the pixel electrode.

7. The method according to claim 1, wherein the reflective electrode overlaps with at least one of the gate line and the data line.

8. The method according to claim 1, wherein the third mask process further includes forming a passivation film formed of an inorganic insulating material under the organic film.

* * * * *